(12) United States Patent  
Harles

(10) Patent No.: US 7,512,505 B2
(45) Date of Patent: Mar. 31, 2009

(54) RANGING SYSTEM FOR DETERMINING RANGING INFORMATION OF A SPACECRAFT

(75) Inventor: Guy Harles, Fentange (LU)

(73) Assignee: SES Astra S.A., Chateau de Betzdorf (LU)

( * ) Notice: Subject to any disclaimer, the term of this patent is extended or adjusted under 35 U.S.C. 154(b) by 414 days.

(21) Appl. No.: 10/675,408

(22) Filed: Sep. 29, 2003

(65) Prior Publication Data

US 2004/0140930 A1  Jul. 22, 2004

Related U.S. Application Data

(63) Continuation of application No. PCT/EP02/00350, filed on Jan. 15, 2002.

(30) Foreign Application Priority Data

Mar. 29, 2001  (EP) .................................. 01108029

(51) Int. Cl.
  *G01S 1/24*  (2006.01)
(52) U.S. Cl. ....................................... 702/89
(58) Field of Classification Search .................... 702/89
  See application file for complete search history.

(56) References Cited

U.S. PATENT DOCUMENTS

| | | | |
|---|---|---|---|
| 4,812,852 A | 3/1989 | Bent et al. | |
| 5,515,056 A | 5/1996 | Henderson et al. | |
| 5,570,096 A | 10/1996 | Knight et al. | |
| 5,621,646 A | 4/1997 | Enge et al. | |
| 5,917,449 A | 6/1999 | Sanderford et al. | |
| 5,991,280 A * | 11/1999 | Ichiyoshi | 370/321 |
| 6,229,477 B1 | 5/2001 | Chang et al. | |
| 6,556,809 B1 * | 4/2003 | Gross et al. | 455/12.1 |

FOREIGN PATENT DOCUMENTS

CN        1288614 A     3/2001

(Continued)

OTHER PUBLICATIONS

Office Action from corresponding Chinese Application No. 02810551.6 dated Nov. 11, 2005.

(Continued)

*Primary Examiner*—Tung S Lau
(74) *Attorney, Agent, or Firm*—Wolf, Greenfield & Sacks, P.C.

(57) ABSTRACT

A ranging system determines ranging information of a spacecraft carrying a component of a communication channel. In order to provide a ranging system for determining ranging information of a satellite carrying a transponder as well as to provide a method thereof which yield a sufficient accuracy without causing further costs when narrow spot beams by the transponder are used, a ranging system includes a plurality of receiving stations at different locations on earth, wherein each receiving station is arranged for receiving a reference signal from the component; a synchronization unit for providing a synchronized time base between the plurality of receiving stations; a calculation unit for calculating the ranging information in accordance with the propagation time of each received reference signal and with the synchronized time base; wherein at least one receiving station includes a correlation receiver for receiving the reference signal.

22 Claims, 20 Drawing Sheets

FOREIGN PATENT DOCUMENTS

| | | |
|---|---|---|
| EP | 1 026 519 A1 | 8/2000 |
| EP | 1 041 397 A2 | 10/2000 |
| JP | H9-223997 | 8/1997 |
| JP | 2000-131413 | 5/2000 |
| JP | 2004-510393 | 4/2004 |
| RU | 2 133 489 C1 | 7/1999 |
| RU | 2 158 935 C2 | 11/2000 |
| WO | H4-27887 | 1/1992 |
| WO | WO 96/022546 A1 | 1/1996 |
| WO | WO 96/25673 A1 | 8/1996 |
| WO | WO 99/037037 A1 | 7/1999 |
| WO | WO 00/14903 A1 | 3/2000 |
| WO | WO 00/48018 A1 | 8/2000 |
| WO | WO 01/093460 A1 | 12/2001 |
| WO | WO 02/27976 A1 | 4/2002 |

OTHER PUBLICATIONS

Office Action from corresponding Australian Application No. 2002226413 dated Apr. 18, 2006.

Search report mailed Mar. 26, 2008 from corresponding European Application No. 03077055.6.3

Notification of Reasons for Refusal dated Nov. 13, 2007 for Japanese Application No. 2002-577576.

* cited by examiner

RANGING SYSTEM FOR DETERMINING RANGING INFORMATION OF A SPACECRAFT

FEILD OF THE INVENTION

The invention refers to a ranging system and a ranging method for determining ranging information of a spacecraft carrying a component of a communication channel. Furthermore, the invention refers to a receiving station and a method for operating a receiving station, a processing station and a processing method, a spacecraft and a method for operating a spacecraft, and a transmission unit and a method for operating a transmission unit.

BACKGROUND

Geo-stationary communication satellites have to be positioned in precisely defined space segments assigned by the International Telecommunication Union (ITU). However, the combined effect of oscillations of a period of 24 hours due to the inclination and eccentricity and the long-term drift of the main longitude leads to an apparent movement of the satellite with respect to its nominal position. Therefore, the satellite has to be controlled under the effect of these perturbations by applying periodic orbit corrections in the most economic manner so that the satellite remains within the so-called station-keeping box. For such a control it is necessary to determine precisely the position and/or movement of the satellite which is usually addressed as ranging.

Due to sophisticated orbit positioning techniques of geo-stationary satellites, the requirements for the accuracy of ranging have increased recently. From DE 198 36 602 A1 it is known to position satellites in a so-called satellite cluster at one geo-stationary orbit position in order to make better use of the narrow orbit space. This means that not just one satellite, but a plurality of satellites have to be controlled in one station-keeping box.

The basic technique for determining the space coordinates of a satellite is based on a trilateration solution as described below. FIG. 1 shows the basic configuration of a trilateration measurement. Three transmission stations 101, 102 and 103 are located on earth, wherein the positions P1, P2 and P3 of each transmission station are known. If the distances d1, d2 and d3 can be measured, then the unknown position P4 of the satellite 104 can be determined. Let $d_i$ denote the distance of the corresponding measurement of each transmission station and let $(x, y, z)$ and $(x_i, y_i, z_i)$ denote the Cartesian coordinates of the satellite 104 and each transmission station $P_i$, respectively. Then the following relation holds:

$$d_i = \sqrt{(x-x_i)^2+(y-y_i)^2+(z-z_i)^2} - \sqrt{(x-x_0)^2-(y-y_0)^2+(z-z_0)^2} = f_i(\bar{q}), i=1,2,3 \quad (1)$$

where $\bar{q}=[x, y, z]^T$ is the unknown position vector of the satellite 104. The vector of the distance measurements is expressed as:

$$\bar{d} = \bar{f}(\bar{q}) \quad (2)$$

A commonly employed method to solve for q in this non-linear equation is the Gauβ-Newton iterative method. The best estimate of $\bar{q}$ is iteratively approximated as:

$$\hat{\bar{q}}_{k+1} = \hat{\bar{q}}_k + \left(\vec{F}^T \vec{F}\right)^{-1} \vec{F}^T \left(\vec{d} - \vec{f}(\hat{\bar{q}}_k)\right) \quad (3)$$

where $\vec{F}$ is the Jacobian matrix:

$$\vec{F} = \frac{\partial \vec{f}}{\partial \vec{q}} = \begin{bmatrix} \frac{\partial f_1}{\partial x} & \frac{\partial f_1}{\partial y} & \frac{\partial f_1}{\partial z} \\ \frac{\partial f_2}{\partial x} & \frac{\partial f_2}{\partial y} & \frac{\partial f_2}{\partial z} \\ \frac{\partial f_3}{\partial x} & \frac{\partial f_3}{\partial y} & \frac{\partial f_3}{\partial z} \end{bmatrix} \quad (4)$$

However, in practice not only a trilateration configuration according to FIG. 1, but any other configuration like e.g. a bilateration or a quadrilateration configuration can be used.

Although a bilateration does not yield the full ranging information of a spacecraft, a bilateration still might be useful if only a certain coordinate of the spacecraft is of interest.

Furthermore, a quadrilateration configuration allows the solution for an additional unknown quantity. FIG. 2 shows the practical configuration of a quadrilateration measurement. Let say the transponder delay D of the transponder carried by the satellite is an additional unknown quantity besides the space coordinates of the spacecraft. Typically, such a transponder comprises frequency converters, high-power amplifiers etc. Then the approach for each distance measurement $d_i$ is as follows:

$$d_i = D + \sqrt{(x-x_i)^2+(y-y_i)^2+(z-z_i)^2} - \sqrt{(x-x_0)^2+(y-y_0)^2+(z-z_0)^2} = f_i(\bar{q}), i=1, 2, 3, 4 \quad (5)$$

where $\bar{q}=[x, y, z]^T$ is again the unknown position vector of the satellite. The solution for $\bar{q}$ can be found by rewriting the formulas (2), (3) and (4) accordingly. The Jacobian matrix is then:

$$\vec{F} = \frac{\partial \vec{f}}{\partial \vec{q}} = \begin{bmatrix} \frac{\partial f_1}{\partial x} & \frac{\partial f_1}{\partial y} & \frac{\partial f_1}{\partial z} & \frac{\partial f_1}{\partial D} \\ \frac{\partial f_2}{\partial x} & \frac{\partial f_2}{\partial y} & \frac{\partial f_2}{\partial z} & \frac{\partial f_2}{\partial D} \\ \frac{\partial f_3}{\partial x} & \frac{\partial f_3}{\partial y} & \frac{\partial f_3}{\partial z} & \frac{\partial f_3}{\partial D} \end{bmatrix} \quad (6)$$

A further unknown quantity is the time delay introduced by the receiving arrangement due to unknown delays, e.g. due to error recovery mechanisms.

From WO 00/48018 it is known to use two separate receiving arrangements in one transmission/receiving station to compensate this kind of unknown delays. FIG. 3 shows a corresponding transmission/receiving station with a compensation of the time delay introduced by the receiving arrangement. The transmission and receiving station 301 comprises a multiplexer/encoder 302, a QPSK modulator 303, an up-converter 304 and a satellite antenna 305. Digital payload signals 306 consist of elementary data streams and are fed to a multiplexer/encoder 302 which converts the plurality of digital payload signals into a single digital transport stream, for example according to the MPEG-2 and DVB standards. The digital transport stream is modulated by the QPSK modulator 303 and fed to the up-converter 304 which represents the equipment necessary to convert the output of the QPSK modulator 303 into a signal that can be fed to the satellite antenna 305 for transmission to a transponder carried by the satellite. Typically, such a transponder comprises frequency converters, high-power amplifiers etc.

The output signal of the QPSK modulator 303, i.e. the modulated digital transport stream is also fed to a first receiving arrangement 307. The processor 308 analyses the series of samples to trace a predetermined signal pattern. If the predetermined signal pattern is traced, the processor 308 sends a start signal START to a time measurement circuit 309. Upon receipt of the start signal START the time measurement circuit 309 begins to measure the time until it receives a stop signal STOP.

The stop signal STOP is generated by a second processor 308' receiving an output signal from a second receiving arrangement 307'. The first and second receiving arrangements 307, 307' are identical regarding their structure and components. The input signal to the second receiving arrangement 3071 is supplied from a down-converter 310 which receives a signal from the satellite antenna 305 and which comprises all the equipment necessary to convert the received signal from the satellite antenna 305 into a signal corresponding to the output signal of the QPSK modulator 303.

However, since the signal has travelled from the satellite antenna 305 to the transponder carried by the satellite 312 and back, the received signal is delayed.

For generating the stop signal STOP, the second processor 308' traces the predetermined bit sequence in the output signal of the second receiving arrangement 307' in the same manner as the first processor 308. Upon detection of the predetermined bit sequence, the second processor 308' sends the stop signal STOP to the time measurement circuit 309 which stops the time measurement. The measured time corresponds to the double distance between the ground station 305 and the transponder carried by the satellite 312, wherein fixed time delays in the up-converter 304, the satellite antenna 305, the transponder carried by the satellite 312 and the down-converter 310 can be subtracted accordingly. Since two identical receiving arrangements 307, 307' are provided, unknown delays, e.g. due to error recovery mechanisms, can be compensated accordingly.

FIG. 4 shows a diagram of a transport stream according to the MPEG-2 standard. The transport stream TS is a sequence of packets basically consisting of a header H (4 bits) and a payload P (184 bits). The header H includes synchronisation information (1 bit), various flags (transport error indicator, payload unit start indicator, transport priority, etc.), a payload identification PID (13 bits) and a continuity counter (4 bits) The payload identification PID is required for demultiplexing the individual elementary data streams. An adaptation field is optional, but is transmitted at least every 0.1 s and contains ancillary program data, especially a program reference clock PCR for regeneration of a 27 MHz clock at the receiving side.

Subsequently, the transport stream TS is processed according to different standards depending on the transmission channel. For transmission via satellites, the European DVB satellite standard (DVB-S) may be applied, which defines among other mechanisms convolutional and read-solomon coding as well as additional error control bits to be added to allow forward error correction (FEC) Similarly, European DVB standards exist for terrestrial (DVB-T) and cable (DVB-C) broadcasting.

The predetermined bit sequence in the transport stream TS can be used to generate trigger signals or predetermined signal patterns on the basis of which the delay caused by the travel path from the satellite ground station to the transponder carried by the satellite and back can be calculated. The predetermined bit sequence may be inserted into the transport stream TS at the uplink side, for example as a specific payload P. In order to avoid insertion of additional packets, the program identification PID or part of it may be used as a predetermined bit sequence. Some PIDs must be present in the transport stream TS, but may have a repetition rate which is too high for the purpose of determining ranging information. Then, the PID may be combined with other information of the transport stream header H, e.g. the continuity counter, in order to define a predetermined bit sequence.

On the basis of the configuration according to FIG. 2, each station can carry out the distance measurement on its own. In a next step, the position of the satellite can be calculated on the basis of formulas (5) and (6) as described above in a central processing station. However, in order to provide independent stations, for each station a transmission equipment has to be provided which makes considerable investments necessary.

An alternative solution is the use of a so-called pseudo ranging configuration. FIG. 5 shows the practical configuration of a quadrilateration measurement by pseudo ranging. Pseudo ranging in the sense of the present application is the simple delay measurement of the time elapsed between the transmission of a signal from one location and the reception of the same signal to another location. In practice, one transmission station and a plurality of receiving stations are established as shown in FIG. 5. Preferably, one receiving station is combined with the transmission station. However, in order to determine for each station the transmission delay, it is now necessary to introduce a time synchronization between all stations. Only if the receiver also knows when the transmitter actually has sent the signal, it is possible to measure the delay or so-called pseudo range. In the case of geo-stationary satellite ranging, the delay is still relatively short (about 250 ms), so that the clock synchronization needs to be highly stable for short periods. More specifically, the synchronization accuracy should be at least below 10 ns.

Naturally, the same compensation technique as known from WO 00/48018 can be applied also for pseudo ranging. FIG. 6 shows separate transmission and receiving stations with a compensation of the time delay introduced by the receiving arrangement. The transmission station 601 comprises a multiplexer/encoder 602, a QPSK modulator 603, an up converter 604 and a first satellite antenna 605. Digital payload signals 606 are elementary data streams and are fed to the multiplexer/encoder 602 which converts the plurality of digital payload signals into a single digital transport stream, for example according to the MPEG-2 and DVB standards as described with reference to FIG. 3. The digital transport stream is modulated by the QPSK modulator. 603 and fed to the up converter 604 which represents the equipment necessary to convert the output of the QPSK modulator 603 into a signal that can be fed to the satellite antenna 605 for transmission to the transponder carried by the satellite 614. Typically, such equipment comprises frequency converters, high-power amplifiers etc.

The output signal of the QPSK modulator 603, i.e. the modulated digital transport stream is also fed to a first receiving arrangement 607. The output signal of the receiving arrangement 607 is processed by a processor 608, which traces the output signal for a predetermined signal pattern. If the processor 608 traces the predetermined signal pattern, it sends a first trigger signal EMISSION to a time measurement circuit 609. Upon receipt of the first trigger signal EMISSION, the time measurement circuit 609 registers the time stamp information (the emission time) supplied by a first clock circuit 611.

Furthermore, the receiving station 612 comprises a second satellite antenna 613 and a down-converter 610' which receives a signal from the second satellite antenna 613 and which comprises all the equipment necessary to convert the received signal from the satellite antenna 613 into a signal corresponding to the output signal of the QPSK modulator 603. However, since the signal has travelled from the first satellite antenna 605 via the transponder carried by the satellite 614 to the second satellite antenna 613, the received signal is delayed.

The output signal of the down converter 610' is supplied to a second receiving arrangement 607'. The first and second receiving arrangements 607, 607' are identical regarding their structures and components, i.e. regarding their influences on the processed signal. The second processor 608' receives the output signal of the second receiving arrangement 607' and traces the output signal for a predetermined signal pattern. Upon detection of the predetermined signal pattern, the second processor 608' sends a trigger signal RECEPTION to a time measurement circuit 609' which registers the time stamp information supplied (i.e. the reception time) by a second clock circuit 611'.

The second time measurement circuit 609' then transmits the time stamp information (the reception time) to the first time measurement circuit 609 which calculates the signal delay on the basis of the time stamp information received from the second time measurement circuit 609' and the time stamp information (the emission time) previously registered by the first time measurement circuit 609.

For future telecommunication satellites, it is planned to replace the currently used wide area beams by narrow spot beams.

FIG. 7 shows a satellite carrying a conventional transponder with a global coverage. The antenna of the transponder has a 3 dB beam width of 17.5° so that the visible part of the earth is covered by the wide area beam. Therefore, all transmission stations are located under one wide area beam, wherein configurations according to FIG. 2 or FIG. 5 are possible. However, as already explained, for future satellites it is planned to replace the currently used wide area beams by narrow spot beams.

FIG. 8 shows a satellite carrying a transponder which is connected to an antenna having several narrow beams. By way of an example, a 3 dB beam width of 1.75° is shown. For example, the narrow spot beam 801 may be used as an uplink transmission path, whereas one or more narrow spot beams 802 may be used as a downlink transmission path. However, for these future satellites, which will only have narrow, asymmetric spot beams, the problem is that a ranging station could only transmit, but not receive its own ranging signal, unless it is located at the intersection of a transmit and a receive beam. This means that a configuration according to FIG. 2 is not possible, but only a configuration according to FIG. 5. Furthermore, due to the small spot beam, the spatial separation between the different pseudo ranging stations is severely reduced and thus the precision of the orbit determination. Especially for co-locating multiple satellites in a single orbit slot (satellite cluster), the accuracy will not be sufficient any more.

FIG. 9 shows the effect of reduced spatial separation between different ranging stations. A two-dimensional representation is shown for simplifying matters which can be easily extended to the three-dimensional case. On the left-hand side a configuration is shown with optimum spatial separation. Two stations (station I, station II) are located on earth at a distance given by the baseline b. Each station performs a ranging measurement, either by a two-way configuration according to FIG. 2 or by a pseudo ranging configuration according to FIG. 5. It can be shown that the uncertainty of the measurement is different with regard to the propagation direction. Across the propagation direction there is a relatively low uncertainty of the ranging measurement, whereas along the propagation direction there is a relatively high uncertainty of the ranging measurement. This effect is symbolised by two error ellipses, one error ellipse for station I and one error ellipse for station II. When the two beams of the stations I and II intersect at right angle, the error in the target position of the satellite may be described as a circle which is given by the intersection of both error ellipses. This means that the high uncertainty along the propagation direction is compensated by the low uncertainty across the propagation direction of the other station.

On the right-hand side of FIG. 9, a configuration is shown with a low spatial separation between two different ranging stations I and II. In this case, the angle of intersection is much below a right angle so that the high uncertainty along the propagation direction cannot be compensated anymore by the other station. Therefore, the intersecting error at the target position of the satellite can be described by a common error ellipse of the stations I and II. This results in a high uncertainty of the ranging measurement across the propagation direction of both stations I and II.

SUMMARY OF THE INVENTION

Therefore, it is an object of the invention to provide a ranging system for determining ranging information of a satellite carrying a transponder as well as to provide a method thereof which yield a sufficient accuracy without causing further costs when narrow spot beams by the transponder are used.

This object is solved by a ranging system and a ranging method according to the claims 1 and 2. Further solutions are given by a receiving station and a method for operating a receiving station according to claims 3 and 4, a processing station and a processing method according to claims 5 and 6, a spacecraft and a method for operating a spacecraft according to claims 7 and 8, and a transmission unit and a method for operating a transmission unit according to claims 9 and 10.

According to the invention a ranging system is based on a pseudo ranging configuration as shown in FIG. 5 comprising a synchronisation means for providing a synchronised time base at least between the plurality of receiving stations. Furthermore, in addition to the synchronised time base at least one receiving station comprises a correlation receiver for receiving the reference signal. The at least one receiving station comprising the correlation receiver can be positioned outside the coverage area of the payload signal. Thereby, the base line between different ranging stations can be increased which yields a larger angle of intersection and thus a higher spatial separation as explained according to FIG. 9.

FIG. 10 shows a satellite carrying a transponder which yields a coverage 1001 by a spot beam. However, a receiver for receiving a reference signal can be placed outside the coverage 1001 by using a correlation receiver according to the invention. In principle, such a receiver can be placed inside the coverage 1002. The spot beam 1001 may have again a 3 dB beam width of 1.75° and may be used for transmitting both a payload signal and the reference signal. In order to enable the placement of several receiving stations outside the footprint of the spot beam 1001, receiving stations 1003 and 1004 are provided with correlation receivers for receiving the reference signal. It has to be noted that the processing of the reference signal is not time crucial and has not to be performed in real time in contrast to the payload signal. Thereby, a long predetermined signal pattern can be provided which can be processed offline. The higher the correlation gain is, the lower the signal-to-noise ratio of the received signal may be, which means in other terms, the further away the receive station may be from the footprint 1001.

FIG. 11 shows the antenna pattern of a satellite antenna. The effective isotropic radiated power (EIRP) is plotted versa the azimuth angle (AZ) or elevation angle (EL), respectively. The chart can also be interpreted as the change of EIRP depending on the position of a corresponding receiving station with regard to the centre of the footprint of the satellite antenna. For example, if a receive station is moved out of the main beam by 0.75 deg (which corresponds to 500 km at a distance of 38400 km), the receive power will drop from 50 to 46.7 dBW for the payload signal. Moving further out to about 1.25 deg (about 840 km) from the footprint centre, the EIRP will drop to 40 dBW.

However, not the EIRP but the carrier to noise ratio (C/N) is the essential value for deciding upon the quality of the received payload signal. Therefore, by way of an example, FIG. 12 shows the relationship between the downlink EIRP and the C/N ratio of a signal received at a receiving station. Curve A shows the relationship for a usual payload signal of 36 MHz bandwidth and curve B shows the relationship for a spread spectrum signal with very high processing gain which is transmitted simultaneously with a payload signal. For both curves it is assumed, that the payload signal is received via a 1.2 m dish from a Ku band transponder.

In a first step it is obvious, that the carrier to noise ratio C/N of the payload signal versa the EIRP follows a linear relationship according to curve A. It can be assumed, that a minimum C/N of 6 dB is needed to receive a payload signal properly. Hence, a corresponding EIRP of 40 dBW is required at the receiving station. From the explanations according to FIG. 11 follows, that a receiving station cannot be positioned further than 840 km from the centre of the satellite footprint assuming a geo-stationary satellite at 38400 km to receive a payload signal with a 1.2 m dish. Consequently, if one wants to increase the distance to the centre of the footprint due to accuracy reasons as explained according to FIG. 9, it is necessary to increase the antenna gain and thus the diameter of the antenna dish. For example, if one wants to position a receiving station at the first side lobe according to FIG. 11, about 20 dB of loss in EIRP have to be compensated by an increased antenna gain. This results in a necessary dish size of about 10 m having 61 dB antenna gain compared to the 1.2 m antenna dish having 41 dB antenna gain for Ku-band.

However, according to the invention a correlation receiver is used which yields a "correlation gain" and therefore allows the processing of a reference signal without increasing the antenna size, even if the payload signal has a negative C/N. All kinds of correlation methods which yield a correlation gain are covered by the invention. Two correlation methods will be discussed in more detail according to FIG. 12, namely the processing of a predetermined signal pattern and the spread spectrum modulation and demodulation.

The use of a predetermined signal pattern which is introduced in the payload signal or in a separate reference signal leads in principle to the same curve A as explained above. However, the curve A is now shifted upwards due to the introduced correlation gain. Therefore, even a negative C/N according to curve A can now be compensated by a corresponding correlation gain, hence enabling to use the same antenna size. It has to be noted that the processing time of the reference signal has not to be done in quasi-real time as it is necessary for the payload signal. Therefore, the receiving stations can well be located outside a given footprint of a narrow spot beam, if the correlation receiver accepts that its signal is received with a very low or even negative signal-to-noise ratio. A processing is still possible, if the time of reception of the predetermined signal pattern is known and is correlated with the predetermined signal pattern in the correlation receiver. In this case, the length of the ranging signal and the height of the correlation peak between transmit and receive signal determines the acceptable level of noise on the receive signal. The higher the correlation gain, the lower the signal-to-noise ratio of the received signal may be, which means in other terms the further away the receive station may be from the main footprint. In this way, the distance between the different receiving stations may be considerably increased.

Another correlation technique is the spread spectrum modulation and demodulation. In this case the payload signal may be a modulated carrier signal, whereas the reference signal is a spread spectrum signal. In spread spectrum modulation and demodulation, the transmitted modulation is spread (increased) in bandwidth prior to transmission over the channel and then despread (decreased) in bandwidth by the same amount at the receiver. By far the most popular spreading techniques are direct sequence (DS) modulation and frequency hopping (FR) modulation.

A direct sequence modulation is formed by linearly modulating the output sequence of a pseudo random number generator onto a chain of pulses, each having a duration called the chip time. This type of modulation is usually used with binary phase-shift-keyed (BPSK) information signals. As such the modulated signal is formed by first multiplying (modulo-2) the pure information bit stream with the pseudo noise sequence and then modulating the phase of a clean carrier signal with the resulting signal.

At the receiver, the PN waveform usually is available at the receiver (however, there are also application which acquire the PN waveform from the received signal). The PN waveform at the receiver is used to despread the received signal again to its original bandwidth.

A frequency hopping modulation is formed by non-linearly modulating a chain of pulses with a sequence of pseudo randomly generated frequency shifts. This modulation signal is multiplied by a complex multiple-frequency-shift-keyed (MFSK) information signal. At the receiver, the sum of the transmitted signal and the channel interference is complex multiplied by the identical frequency hopping modulation which returns the transmitted signal to its original MFSK form. Analogous to the direct sequence case, the receiver knows the dehopping waveform or must alternatively acquire and track the frequency-hopped signal.

The use of a spread spectrum modulation of the reference signal leads to curve B in FIG. 12. Curve B differs from curve A, because the reference signal RS is not only disturbed by the noise N as seen from the antenna, but also by the payload signal itself. For high EIRP values, the degradation for the ranging signal is dominated by the carrier level due to C>>N. For instance, at high EIRP the C/N is about 12 . . . 14 dB typically. If the receiving station is removed out of the footprint, C and RS are attenuated by the same amount. On the other hand, N remains constant. This explains, why RS/(C+N) decreases far less than C which makes it possible to use spread spectrum modulation also as a correlation technique.

For example, in the footprint centre a C/N of about 16 dB and a RS/(C+N) of −25 dB is obtained. If the processing gain of the reference signal is about 40 dB, this signal still can be received and processed. At an EIRP of 40 dBW, the C/N decreases by 10 dB to about 6 dB, whereas the spread signal merely decreases to −25.8 dB, which is only 0.8 dB less than in the centre of the footprint. Furthermore, if the EIRP drops by 20 dB' to 30 dBW, the C/N of the payload signal decreases by 20 dB to −3 dB, which makes a standard video signal impossible to decode. However, the reference signal decreases only by 5 dB to about −30 dB which is still possible to decode assuming a processing gain of >35 dB.

A further correlation technique for receiving an MPEG data stream is known from EP 1 041 397 A2. Usually, a predetermined signal pattern in an MPEG stream cannot be used for triggering a time measurement element in the receiver because the time resolution is not sufficiently high due to non-deterministic signal delays in the decoder. In order to increase the accuracy, a two-stage method is proposed, using a combination of a direct processing of the MPEG stream after the decoder and a direct correlation of the analogue signal before the decoder. The direct processing of the MPEG stream after the decoder yields a rough estimation of the propagation time of the predetermined signal pattern including the non-deterministic signal delays in the decoder. Based on this rough estimation, a high-precision correlation is performed on the digitised analogue signal before the decoder. The result of the high-precision correlation is used for correcting the rough determination. However, this method still needs a sufficient C/N to enable the rough processing of the demodulated signal. If no rough processing is possible in the first stage, the exact signal pattern of the modulated signal behind the LNB and before the demodulator has to be known in order to be able to apply a correlation on the analogue reference signal.

Eventually, it goes without saying that all combinations of correlation techniques are also possible in order to increase the correlation gain even further. In particular, it is possible to use a spread spectrum reference signal containing a predetermined signal pattern, wherein the despreaded signal is again subject to a cross-correlation with the pre-stored predetermined signal pattern or subject to an autocorrelation.

Hence, in all cases the use of a correlation receiver in a receiving station has the advantage that the additional correlation gain and/or processing gain may compensate for lack of signal to noise ratio, and thus leads to a reception of the reference signal without increasing the antenna size.

There are several possibilities for providing a time synchronization between the different receiving stations. One possibility is to provide a high-precision GPS time transfer. The global positioning system (GPS) is not only a navigation system, but it is also a time transfer system. The present accuracy of GPS time transfer is of the order 10-20 ns for intercontinental distances and 2-3 ns within one continent. Various GPS time transfer techniques have been proposed e.g. in *GPS Time Transfer*, Wlodzimierz Lewandowski and Claudine Thomas, *Proceedings of the IEEE*, vol. 79, No. 7, July 1991. Another technique of time transfer is the so-called two-way time transfer via communication satellites, which is further explained e.g. in *Two-Way Time Transfer via Communication Satellites*, Dieter Kirchner, *Proceedings of the IEEE*, vol. 79, NO. 7, July 1991. In contrast to the usual one-way mode of operation, in the two-way technique the stations involved in a time transfer have to exchange timing signals via satellite and therefore require receive- and transmit stations, e.g. like a configuration according to FIG. 2. In general this means more expensive equipment and more elaborate operational procedures than with the one-way method. Moreover, because the two-way mode is a point-to-point technique, the users have to work in pairs and need to exchange their measurement data. The main advantage of the two-way time transfer technique is that in contrast to the one-way method the knowledge of the satellite and user positions is not the limiting factor for the obtainable accuracy, because for reciprocal, paths between the stations the path delays cancel out and have therefore not to be calculated. Because of this fact, the two-way method has the potential to be the most accurate time transfer method and hence there might be some applications even for the two-way time transfer method.

According to a further aspect of the present invention, a time synchronization method is proposed which is not known in prior art. This new time synchronization method is based on the cognition that a time synchronization is provided by a common time base in combination with a correction of the synchronization error of the common time base by a reference ranging information of a reference satellite. Hence, besides the satellite whose position has to be determined, another reference satellite is needed whose position is known precisely in advance. If such a reference satellite is available, it can be observed that the synchronization error for one receiving station with regard to the central transmission station is approximately the same for the two satellite. This means that even a common time base with a usually non-sufficient time synchronization can be used by compensating the time synchronization errors using the ranging measurement of the reference satellite whose position is known.

According to the present invention, there are several possibilities for locating the receiving stations with regard to the footprint centre of the transponder antenna carried by the satellite. In any case it will be an aim to locate the receiving stations such to achieve an optimal accuracy of calculation of said ranging information. The usual case might be a configuration of one transmission station and four receiving stations, wherein the transmission station comprises already one receiving station. For this configuration an optimal accuracy of calculation can be achieved, if three receiving stations are located equispaced on a circle and the transmission station in the middle, thereby forming an equilateral triangle with regard to the satellite.

It is understood that the present invention is not limited to a satellite carrying a transponder, but that the ranging of a communications satellite is only a preferred aspect of the present invention. In general, The coordinates of any spacecraft can be determined according to the invention, which carries a component of a communication channel which allows the measurement of a transmission delay between the component and a plurality of receiving stations. This means, that such a component can be a transponder, but also a repeater, mirror, etc. Furthermore, the term "spacecraft" in the sense of the present invention covers any moving or movable object.

According to a further solution of the invention a control unit and a method for operating a control unit is provided for controlling the position of a spacecraft carrying a component of a communication channel. The functionality of a control station for a satellite is summarized by the terms telemetry, tracking and command (TTC). TTC deals with the following:

Receiving control signals from the ground to initiate manoeuvres and to change the state or mode of operation of equipment.

Transmitting results of measurements, information concerning satellite operation, the operation of equipment and verification of the execution of commands to the ground.

Enabling measurement of the ground-satellite distance, and possibly the radial velocity, in order to permit location of the satellite.

In summary, the above-identified object of the invention is solved by the following features, which are listed in dependency order according to the subject subject matters mentioned above:.

1. Ranging system for determining ranging information of a spacecraft carrying a component of a communication channel, comprising:

a plurality of receiving stations at different locations on earth, wherein each receiving station is arranged for receiving a reference signal from said component;

synchronisation means for providing a synchronised time base between the plurality of receiving stations;

calculation means for calculating said ranging information in accordance with the propagation time of each received reference signal and with the synchronised time base;

wherein at least one receiving station comprises a correlation receiver for receiving the reference signal.

2. Ranging system according to subject matter 1, wherein the component is a transmitter transmitting the reference signal to the plurality of receiving stations.

3. Ranging system according to one of the subject matters 1-2, wherein the component is a, transponder and wherein at least one transmission station transmits a payload signal and a reference signal via said transponder.

Hence, any component is possible which allows an interconnection between the spacecraft and the plurality of receiving stations. This means, that both transmitters and transponders can be used. Having a satellite, the transmitter is used when no uplink path is present, whereas the transponder is used to interconnect between an uplink path and a downlink path.

4. Ranging system according one of the subject matters 1-3, wherein the antenna size of the at least one receiving station comprising a correlation receiver is minimised by utilising the receiving gain of the correlation receiver.

This means, that the invention also enables the use of receiving stations with low cost receiving components. Futhermore, as mentioned above, the correlation receiver allows to place the corresponding receiving station outside the footprint of said component of the satellite for achieving an improved accuracy of calculation of said ranging information.

All kinds of correlation receiver are possible according to the invention, which yield a kind of correlation gain for improving the signal to noise ratio of the reference signal. In particular, the following kinds of correlation receivers are possible:

5. Ranging system according to one of the subject matters 1-4, wherein a predetermined signal pattern is stored in the correlation receiver for detecting a corresponding predetermined signal pattern contained in the reference signal.

6. Ranging system according to subject matter 5, wherein the predetermined signal pattern is stored in a predetermined signal pattern in the modulated reference signal.

7. Ranging system according to subject matter 5, wherein the predetermined signal pattern is stored in a demodulated form for detecting corresponding predetermined signal pattern in the demodulated reference signal.

8. Ranging system according to one of the subject matters 1-7, wherein the correlation receiver is a spread spectrum receiver and the reference signal is a spread spectrum signal.

Another important aspect of the invention is the time synchronisation of the plurality of receiving stations. In the case of geo-stationary satellite ranging, the delay is still relatively short (about 250 ms), so that the clock synchronization needs to be highly stable for short periods. More specifically, the synchronization accuracy should be at least below 10 ns. Preferred techniques of time synchronization are:

9. Ranging system according to one of the subject matters 1-8, wherein the synchronisation means provides a high precision GPS time transfer.

10. Ranging system according to one of the subject matters 1-8, wherein the synchronisation means provides a two way time transfer.

11. Ranging system according to one of the subject matters 1-8, wherein the synchronisation means provides a common time base and wherein the synchronization error of the common time base is corrected by a reference ranging information of a reference spacecraft.

It goes without saying that the payload signal and the reference signal can be part of one information stream transmitted over the communication channel:

12. Ranging system according to one of the subject matters 1-11, wherein the payload signal and the reference signal are part of one or more digital transport streams.

The subject matters 2-12 as described for the ranging system apply also for other categories of subject matters. Further categories of subject matters are:

13. Ranging method for determining ranging information of a spacecraft carrying a component of a communication channel, comprising the steps of:

receiving a reference signal from said component independently by a plurality of receiving stations at different locations on earth;

providing a synchronised time base between the plurality of receiving stations;

calculating said ranging information in accordance with the propagation time of each received reference signal and with the synchronised time base;

wherein at least one receiving station carries out a correlation operation for receiving the reference signal.

14. Ranging method according to subject matter 13, wherein the component transmits the reference signal to the plurality of receiving stations.

15. Ranging method according to one of the subject matters 13-14, wherein the component repeats the reference signal to the plurality of receiving stations.

16. Ranging method according to one of the subject matters 13-15, wherein the antenna size of the at least one receiving station comprising a correlation receiver is minimised by utilising the receiving gain of the correlation receiver.

17. Ranging method according to one of the subject matters 13-16, wherein a predetermined signal pattern is stored in the correlation receiver for detecting a corresponding predetermined signal pattern contained in the reference signal.

18. Ranging method according to subject matter 17, wherein the predetermined signal pattern is stored in a modulated form for detecting a corresponding predetermined signal pattern in the modulated reference signal.

19. Ranging method according to subject matter 17, wherein the predetermined signal pattern is stored in a demodulated form for detecting a corresponding predetermined signal pattern in the demodulated reference signal.

20. Ranging method according to one of the subject matters 13-19, wherein the correlation operation is based on a spread spectrum technique and the reference signal is a spread spectrum signal.

21. Ranging method according to one of the subject matters 13-20, wherein the time synchronisation is provided by high precision GPS time transfer.

22. Ranging method according to one of the subject matters 13-20, wherein the time synchronisation is provided by two way time transfer.

23. Ranging method according to one of the subject matters 13-20, wherein the time synchronisation is provided by a common time base and wherein the synchronisation error of the common time base is corrected by a reference ranging information of a reference spacecraft.

24. Ranging method according to one of the subject matters 13-23, wherein the payload signal and the reference signal are part of one or more digital transport streams.

25. Receiving station for providing ranging information of a spacecraft carrying a component of a communication channel, comprising:

a correlation receiver for receiving a reference signal from said component; and synchronisation means for providing a synchronised time base between said receiving station and a reference point on earth.

26. Receiving station according to subject matter 25, wherein the antenna size of said receiving station is minimised by utilising the receiving gain of the correlation receiver.

27. Receiving station according to one of the subject matters 25-26, wherein a predetermined signal pattern is stored in the correlation receiver for detecting a corresponding predetermined signal pattern contained in the reference signal.

28. Receiving station according to subject matter 27, wherein the predetermined signal pattern is stored in a modulated form for detecting a corresponding predetermined signal pattern in the modulated reference signal.

29. Receiving station according to subject matter 27, wherein the predetermined signal pattern is stored in a demodulated form for detecting a corresponding predetermined signal pattern in the demodulated reference signal.

30. Receiving station according to one of type subject matters 25-29, wherein the correlation receiver is a spread spectrum receiver and the reference signal is a spread spectrum signal.

31. Receiving station according to one of the subject matters 25-30, wherein the synchronisation means provides a high precision GPS time transfer.

32. Receiving station according to one of the subject matters 25-30, wherein the synchronisation means provides a two way time transfer.

33. Receiving station according to one of the subject matters 25-30, wherein the synchronisation means provides a common time base and wherein the synchronization error of the common time base is corrected by a reference ranging information of a reference spacecraft.

34. Method for operating a receiving station for providing ranging information of a spacecraft carrying a component of a communication channel, comprising the steps of:

receiving a reference signal from said component; and providing a synchronised time base between said receiving station and a reference point on earth.

35. Method according to subject matter 34, wherein the antenna size of said receiving station is minimised by utilising the receiving gain of the correlation receiver.

36. Method according to one of the subject matters 34-35, wherein a predetermined signal pattern is stored in the correlation receiver for detecting a corresponding predetermined signal pattern contained in the reference signal.

37. Method according to subject matter 36, wherein the predetermined signal pattern is stored in a modulated form for detecting a corresponding predetermined signal pattern in the modulated reference signal.

38. Method according to subject matter 36, wherein the predetermined signal pattern is stored in a demodulated form for detecting a corresponding predetermined signal pattern in the demodulated reference signal.

39. Method according to one of the subject matters 34-38, wherein the correlation receiver is a spread spectrum receiver and the reference signal is a spread spectrum signal.

40. Method according to one of the subject matters 34-39, wherein the synchronisation means provides a high precision GPS time transfer.

41. Method according to one of the subject matters 34-39, wherein the synchronisation means provides a two way time transfer.

42. Method according to one of the subject matters 34-39, wherein the synchronisation means provides a common time base and wherein the synchronization error of the common time base is corrected by a reference ranging information of a reference spacecraft.

43. Processing station for determining ranging information of a spacecraft carrying a component of a communication channel, comprising:

propagation time data receiving means for receiving propagation time data from a plurality of receiving stations at different locations on earth, wherein said receiving stations are arranged for receiving independently a reference signal from said component, wherein a synchronised time base is provided between the plurality of receiving stations, and wherein at least one receiving station comprises a correlation receiver for receiving the reference signal.

44. Processing method for determining ranging information of a spacecraft carrying a component of a communication channel, comprising:

receiving propagation time data from a plurality of receiving stations at different locations on earth, wherein said receiving stations are arranged for receiving independently a reference signal from said component, wherein a synchronised time base is provided between the plurality of receiving stations, and wherein at least one receiving station comprises a correlation receiver for receiving the reference signal.

45. Spacecraft, comprising:

a component of a communication channel for transmitting or repeating a reference signal to a plurality of receiving stations at different locations on earth, wherein a synchronised time base is provided between the plurality of receiving stations, and wherein the reference signal is arranged to be received by a correlation receiver.

46. Method for operating a spacecraft, comprising the steps of:

providing a component of a communication channel at the spacecraft, wherein the component is arranged for transmitting or repeating a reference signal to a plurality of receiving stations at different locations on earth and wherein a synchronised time base is provided between the plurality of receiving stations, and wherein the reference signal is arranged to be received by a correlation receiver.

47. Transmission unit, comprising:

first transmission means for transmitting a reference signal to a plurality of receiving stations via a transponder carried by a spacecraft, wherein the reference signal is arranged to be received by a correlation receiver, and synchronisation means for providing a synchronised time base between the transmission unit and the plurality of receiving stations, 48. Transmission unit according to subject matter 47, wherein the ranging information of said spacecraft is calculated in accordance with the propagation time of the reference signal between said transmission unit and each of the plurality of receiving stations and with the synchronised time base.

49. Transmission unit according to subject matter 48, comprising a second transmission means for transmitting a command signal to said transponder to change the state or mode of operation of said spacecraft depending on the ranging information.

50. Method for operating a transmission unit, comprising the steps of:

transmitting a reference signal to a plurality of receiving stations via a transponder carried by a spacecraft, wherein the reference signal is arranged to be received by a correlation receiver, and providing a synchronised time base between the transmission unit and the plurality of receiving stations, 51. Method according to subject matter 50, wherein ranging information of said spacecraft is calculated in accordance with the propagation time of the reference signal between said transmission unit and each of the plurality of receiving stations and with the synchronised time base.

52. Transmission unit according to subject matter 51, a command signal is transmitted to said transponder to change the state or mode of operation of said spacecraft depending on the ranging information.

It is understood that all aspects of the invention described above can be applied not only in the described combination but also in other combinations or alone.

BRIEF DESCRIPTION OF THE DRAWINGS

The invention will now be described by way of an example and with reference to the accompanying drawings in which.

DETAILED DESCRIPTION OF THE DRAWINGS

FIGS. 1-12 have been described already in the introductory part of the description.

Figure 13:
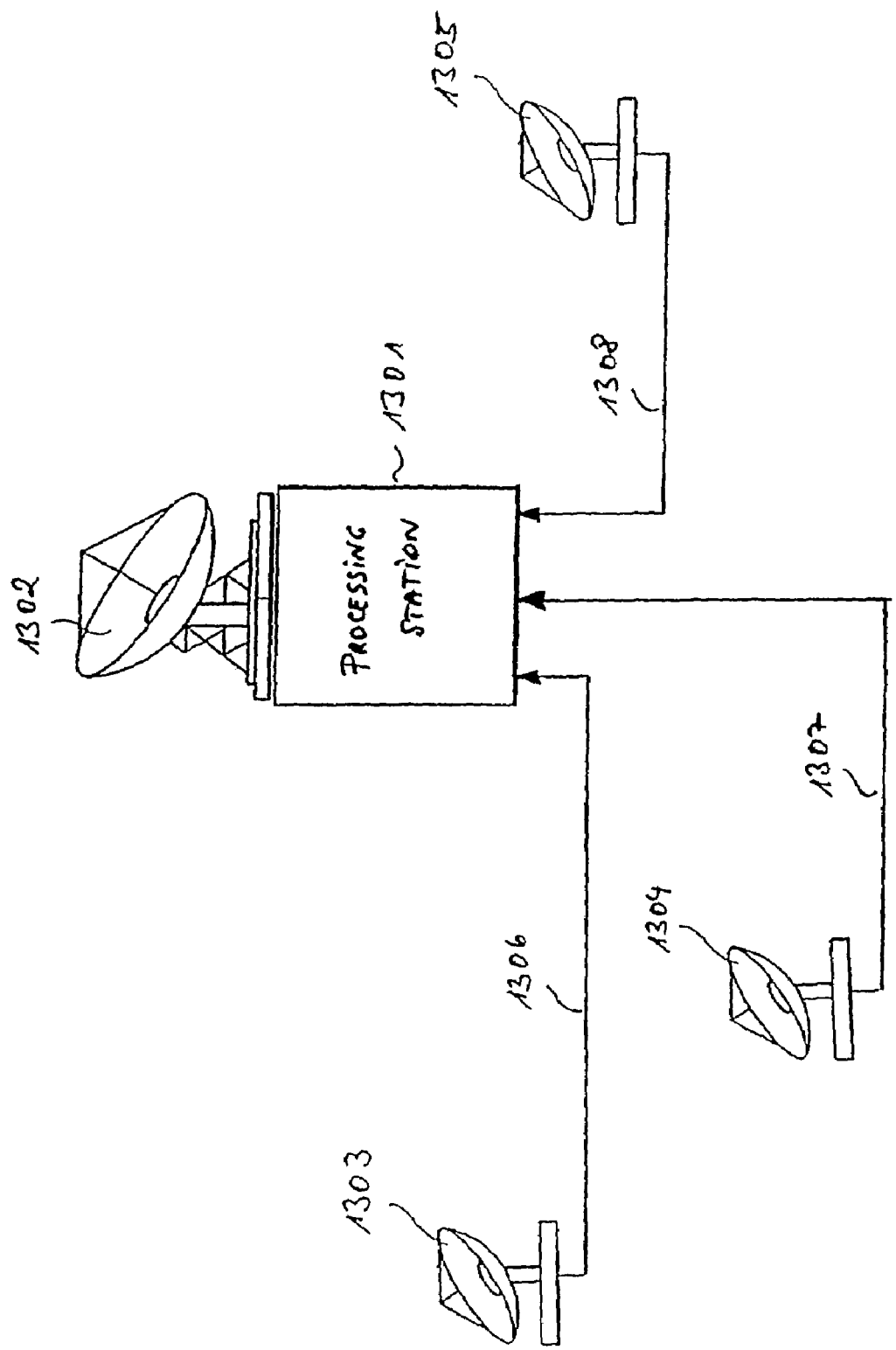
FIG. 13 shows the interconnection of a processing station with remote receiving stations.

FIG. 13 shows the interconnection of a processing station with remote receiving stations. A pseudo ranging configuration for the receiving stations may be assumed according to FIG. 5. Hence, it is assumed that the stations 1303, 1304 and 1305 are receiving stations, wherein the station 1302 is a transmission/receiving station. The internal equipment of the station 1302 may be designed according to FIG. 3, whereas the internal equipment of the stations 1303, 1304 and 1305 may be designed according to FIG. 6. It is advantageous to integrate the processing station 1301 within the transmission/receiving station 1302, wherein telecommunication links 1306, 1307 and 1308 are provided between the receiving stations 1303, 1304 and 105 and the processing station 1301. The processing station 1301 receives the propagation time data from each receiving station in order to calculate the ranging information of the corresponding satellite. The calculation is carried out on the basis of the formulas (1)-(6) as described above.

Since at least one receiving station comprises a correlation receiver, the propagation times can be fixed independently from the footprint area so that an improved accuracy of calculation of said ranging information can be achieved. Furthermore, it is possible to introduce ambiguity and plausibility checks in the processing station on the basis of the expected propagation time data.

Figure 14:
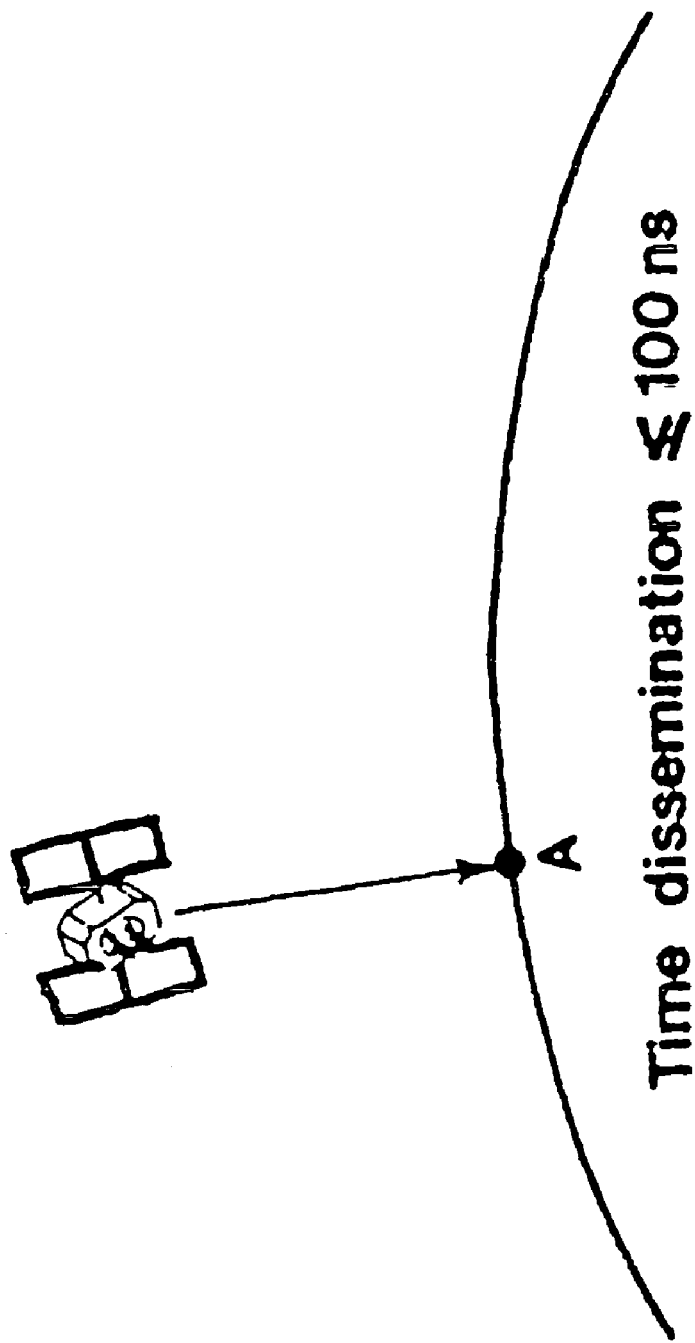
FIGS. 14-17 show different time transfer techniques.

FIGS. 14-17 show different time transfer techniques on the basis of the global positioning system (GPS). FIG. 14 shows the principle of the time dissemination method. This method is the simplest-and least accurate, but has a global coverage and requires no other data than those provided by the receiver. The accuracy of access to GPS time depends on local conditions of observation, mainly on the quality of the receiver antenna co-ordinates and on the amount of the required data. With antenna coordinates having an uncertainty of 10 m this accuracy is in the range of 100 ns for a 13 min track.

Figure 15:
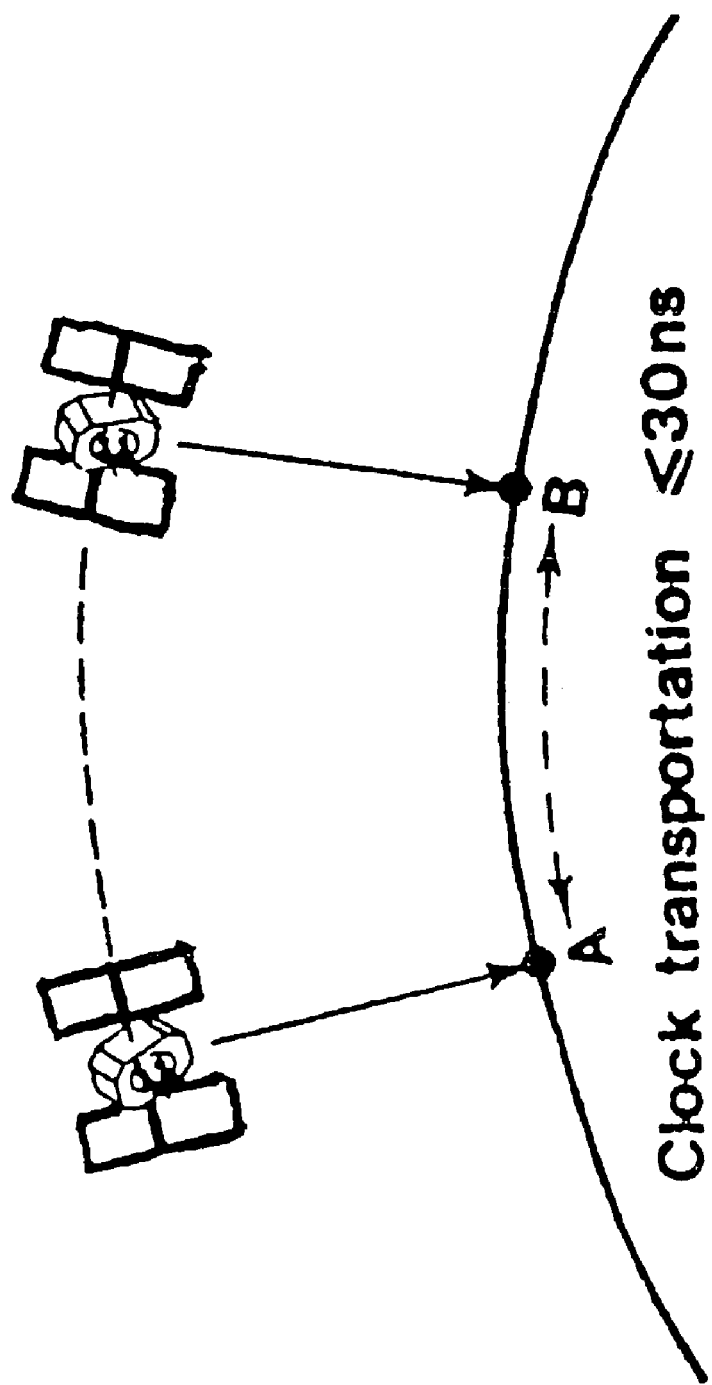

FIG. 15 shows the method of clock transportation. Clock transportation is of interest for high-accuracy time comparisons with 10 ns or less. The clocks A and B, at different locations anywhere on the earth, can be compared by making successive observations of the same satellite, or of the group of satellites, with delayed view times of less than 12 h. This gives the advantage of observing satellites at their maximum of elevation and so decreasing the sensitivity to models of refraction. This method is however subject to the satellite clock instabilities, which are about 5 ns over 12 h.

Figure 16:
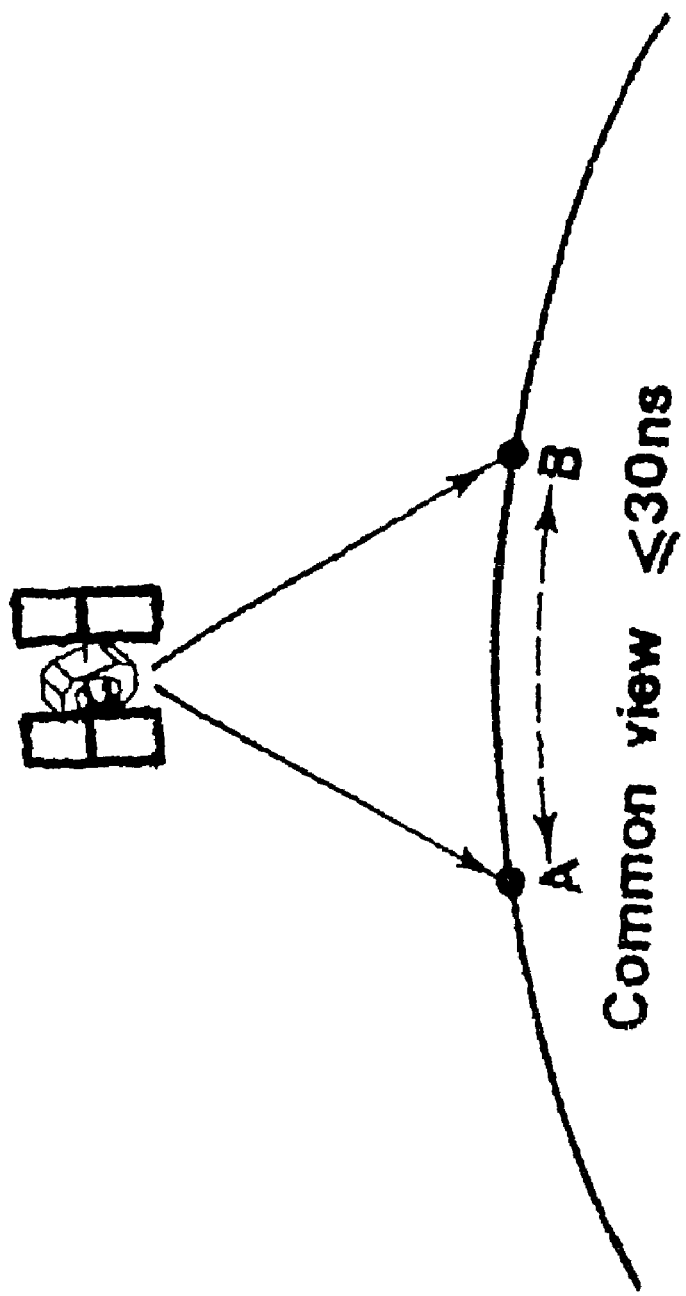

FIG. 16 shows the GPS common view method. Stations A and B or more stations receive the signals of the same satellite at the same time and communicate the data to each other to compare their clocks. The main advantage of this method is that satellite clock error contributes nothing because the GPS time disappears in the difference. The ultimate accuracy of common view mode is about 1 ns.

Figure 17:
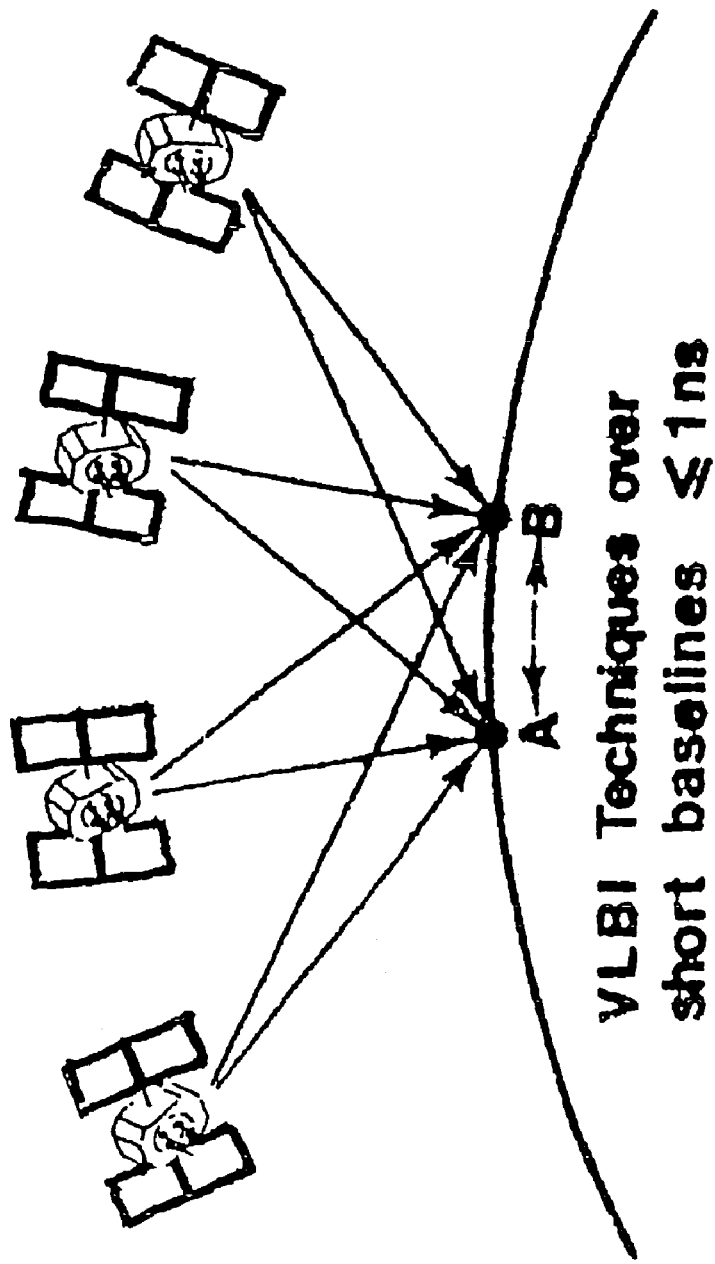

FIG. 17 shows the VLBI techniques over short base lines. This method uses the techniques of very long base interferometry (VLBI) and can be applied for time comparisons with an accuracy below 1 ns over base lines of the order of 100 km.

Besides the GPS time transfer methods, another time synchronization method according to another aspect of the invention will be described according to the FIGS. 18-21. The principle idea of this time synchronization method is to provide a common time base for the different receiving stations, wherein the synchronization error of the common time base is corrected by a reference ranging information of a reference satellite, whose space coordinates are exactly known.

Figure 1:
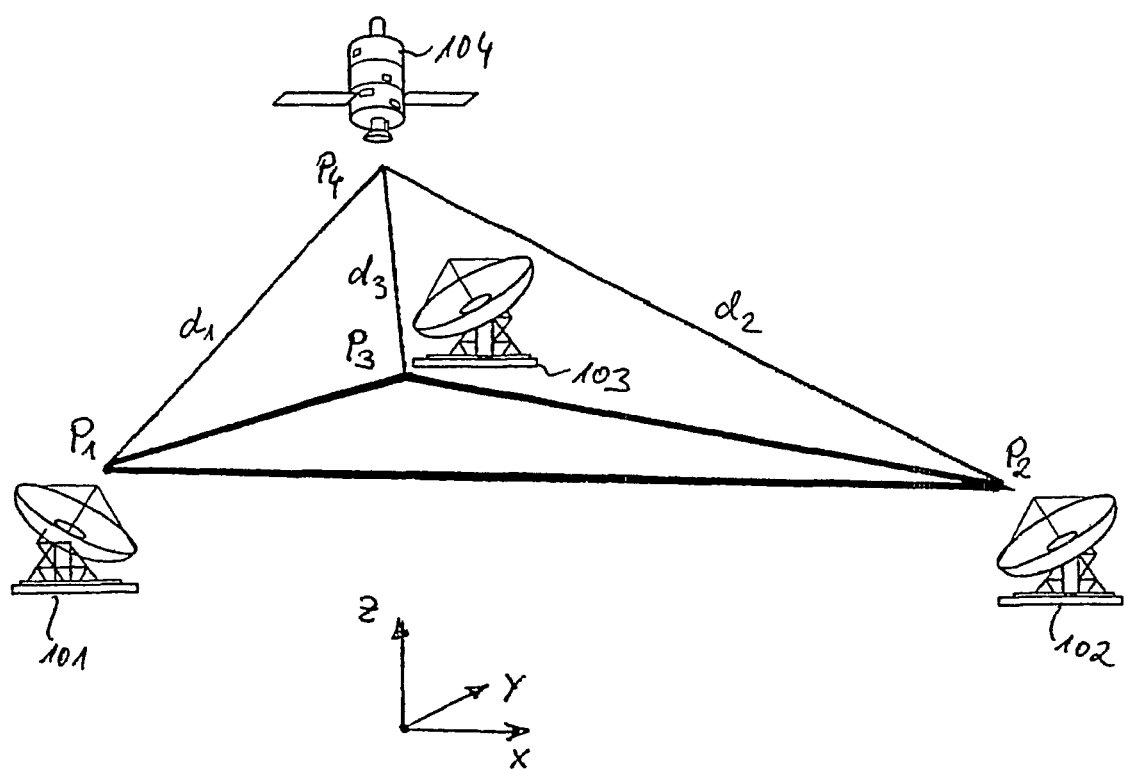
FIG. 1 shows the basic configuration of a trilateration measurement.
Figure 2:
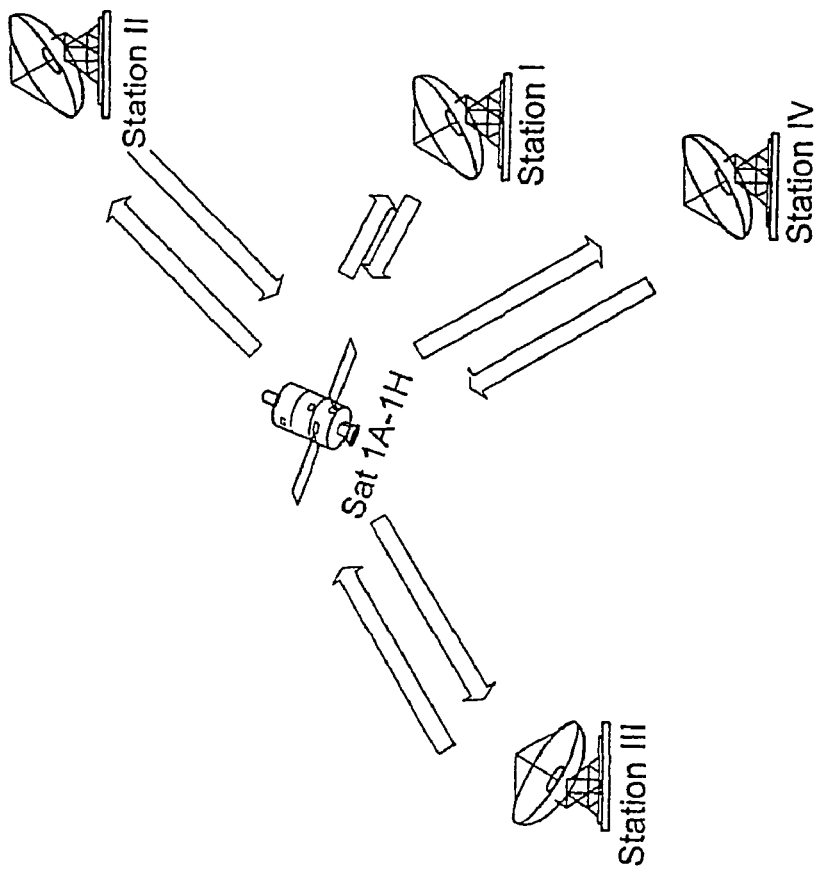
FIG. 2 shows the practical configuration of a quadrilateration measurement.
Figure 3:
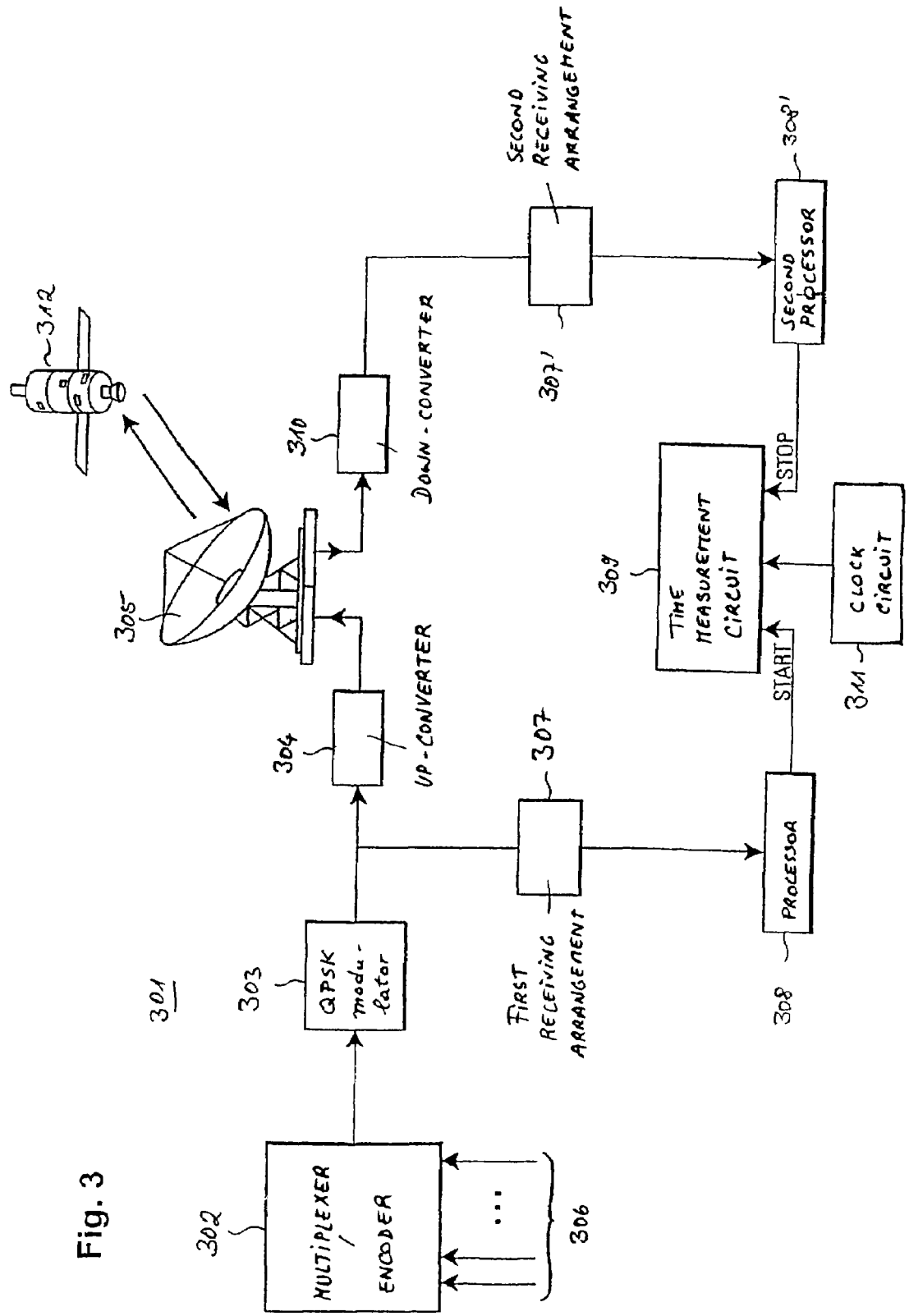
FIG. 3 shows a transmission and receiving station with a compensation of the time delay introduced by the receiving arrangement.
Figure 4:
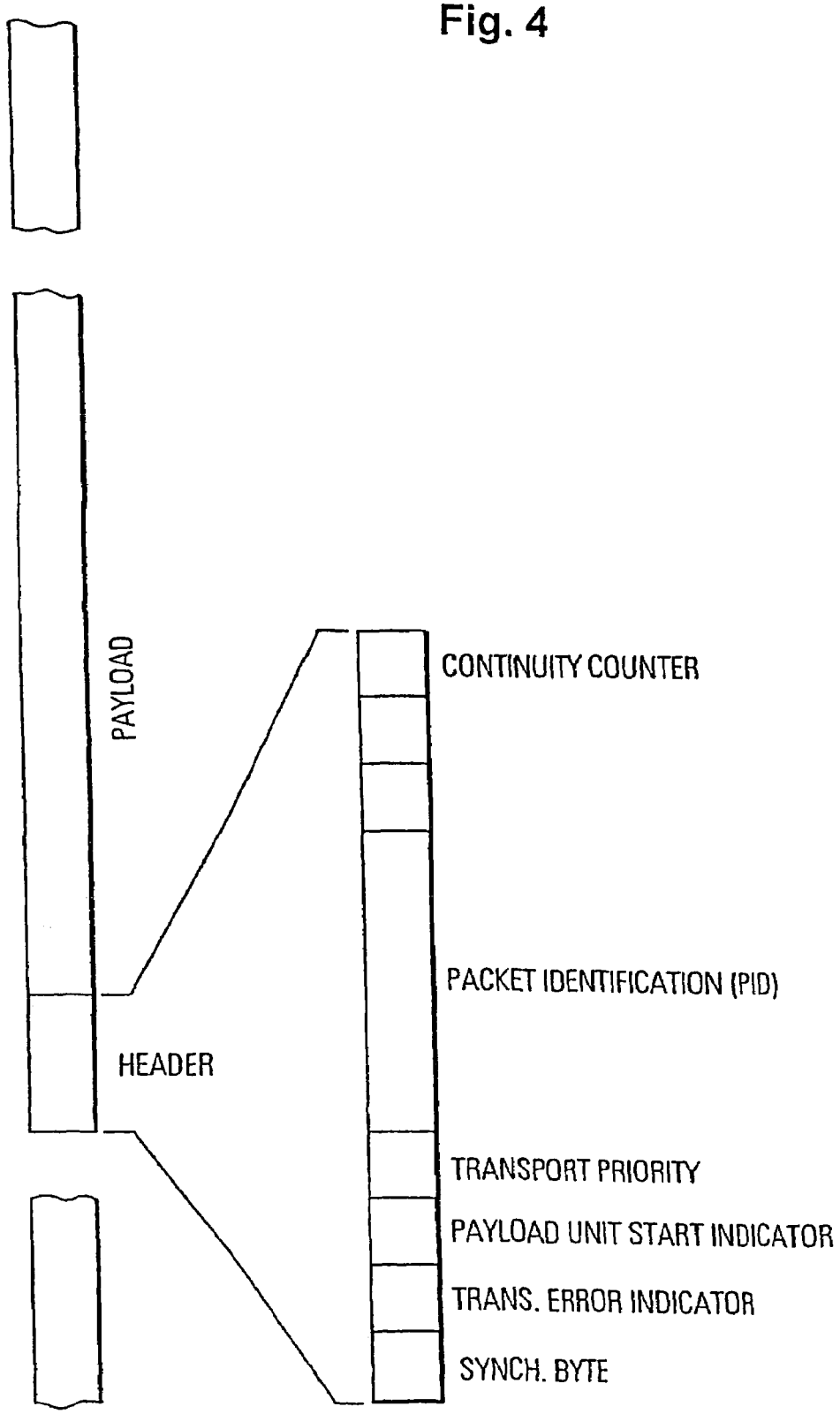
FIG. 4 shows a diagram of a transport stream according to the MPEG-2 standard.
Figure 5:
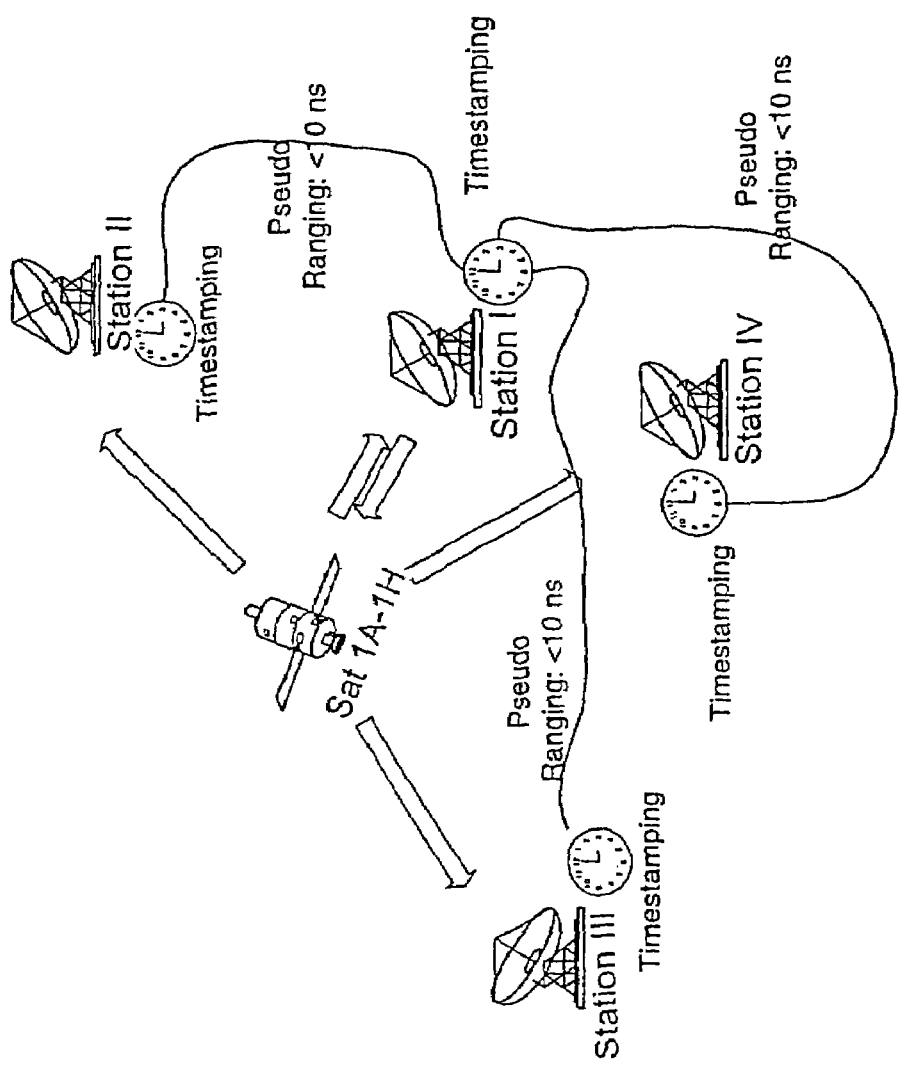
FIG. 5 shows the practical configuration of a quadrilateration measurement according to pseudo ranging.
Figure 6:
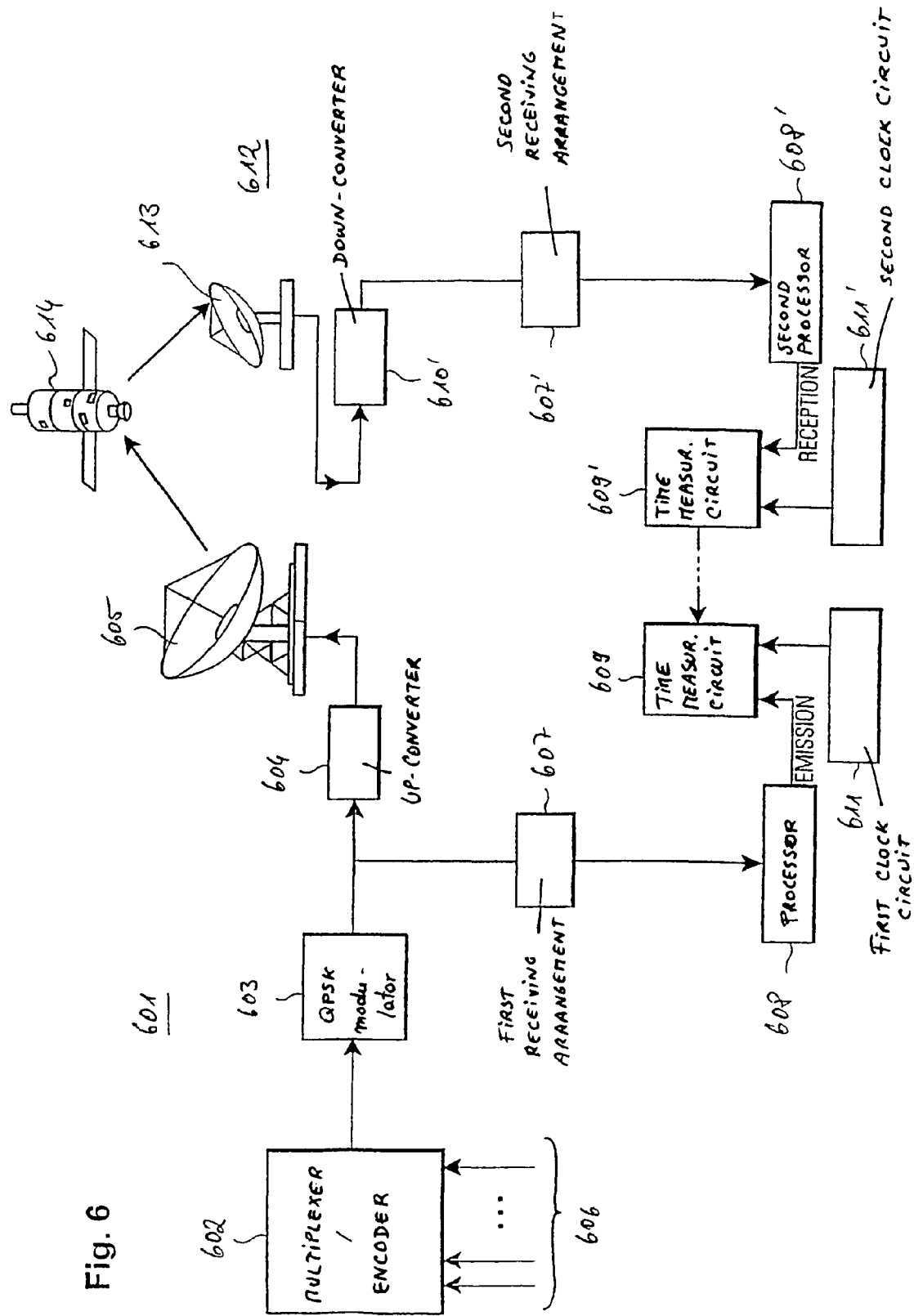
FIG. 6 shows separate transmission and receiving stations with a compensation of the time delay introduced by the receiving arrangement.
Figure 7:
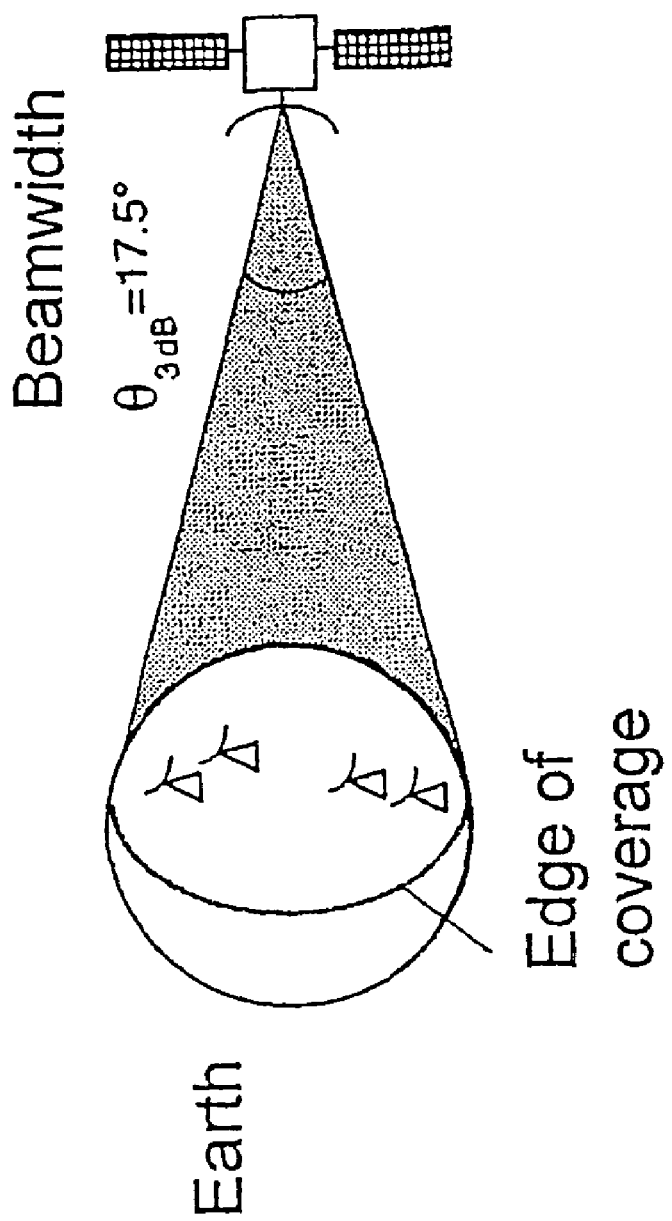
FIG. 7 shows a satellite carrying a transponder with a global coverage.
Figure 8:
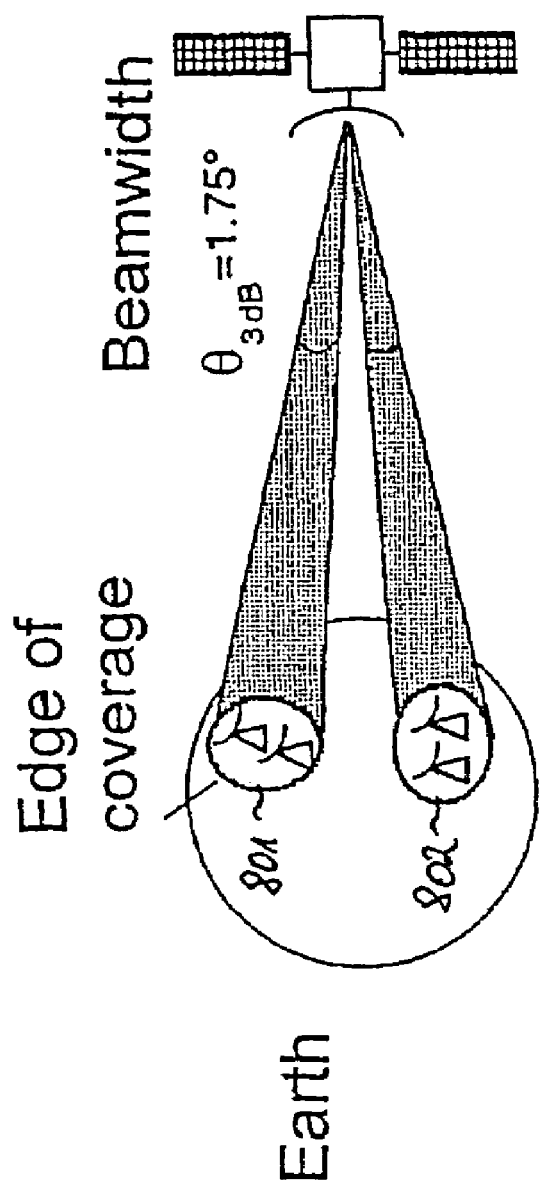
FIG. 8 shows a satellite carrying a transponder with a coverage by several narrow beams.
Figure 9:
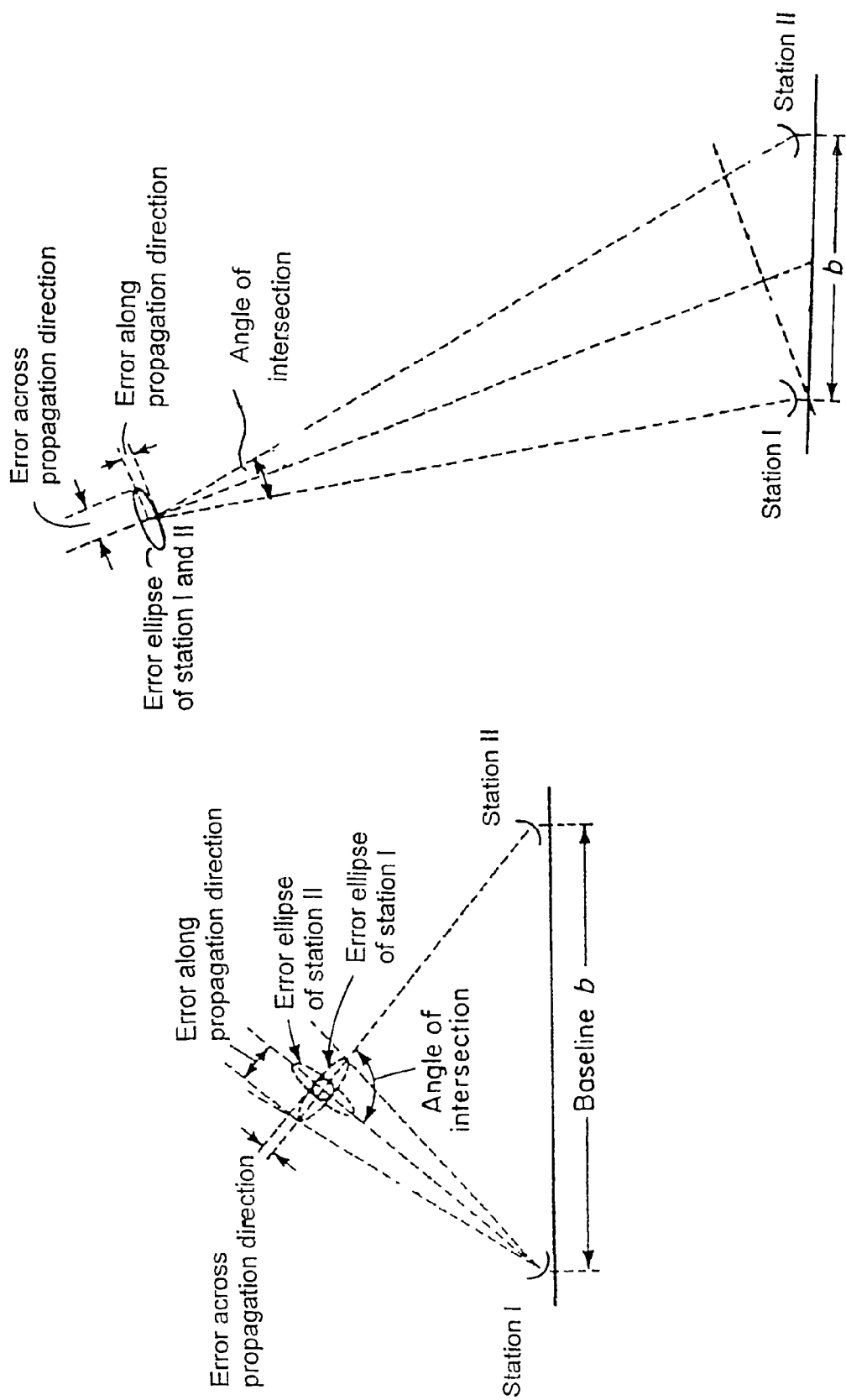
FIG. 9 shows the effect of reduced spatial separation between different ranging stations.
Figure 10:
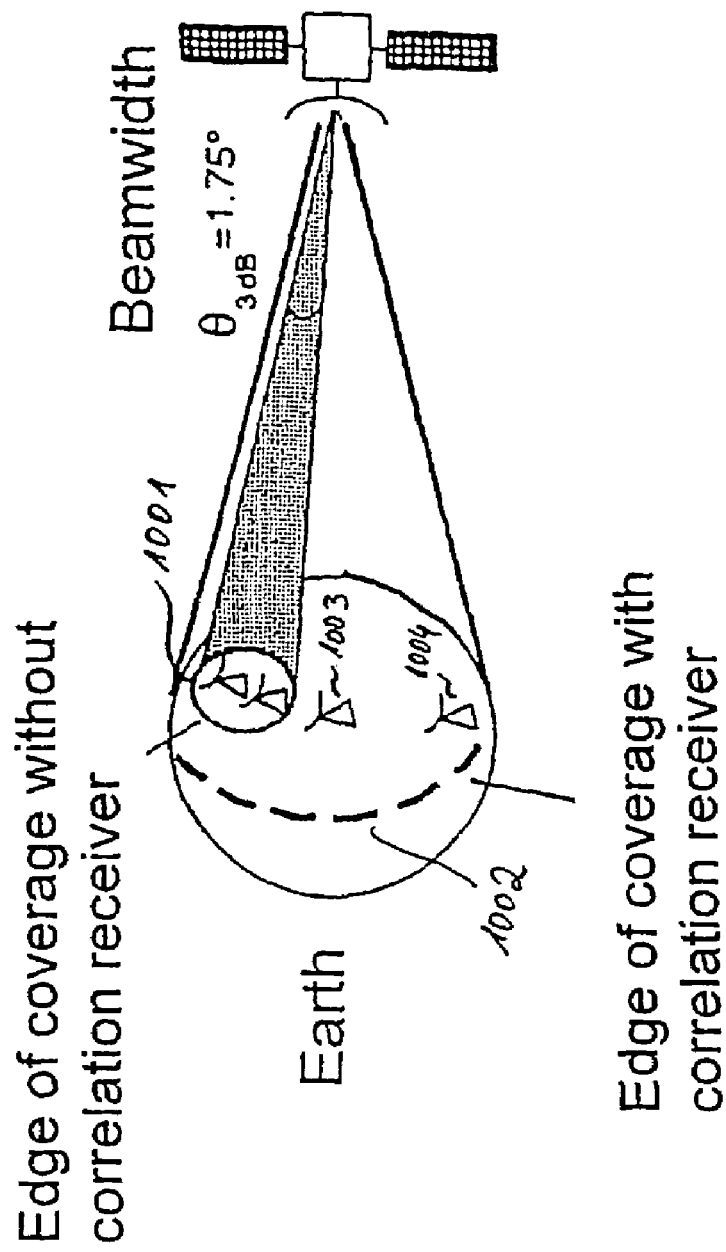
FIG. 10 shows a satellite carrying a transponder with a coverage by a spot beam and by a correlation receiver.
Figure 11:
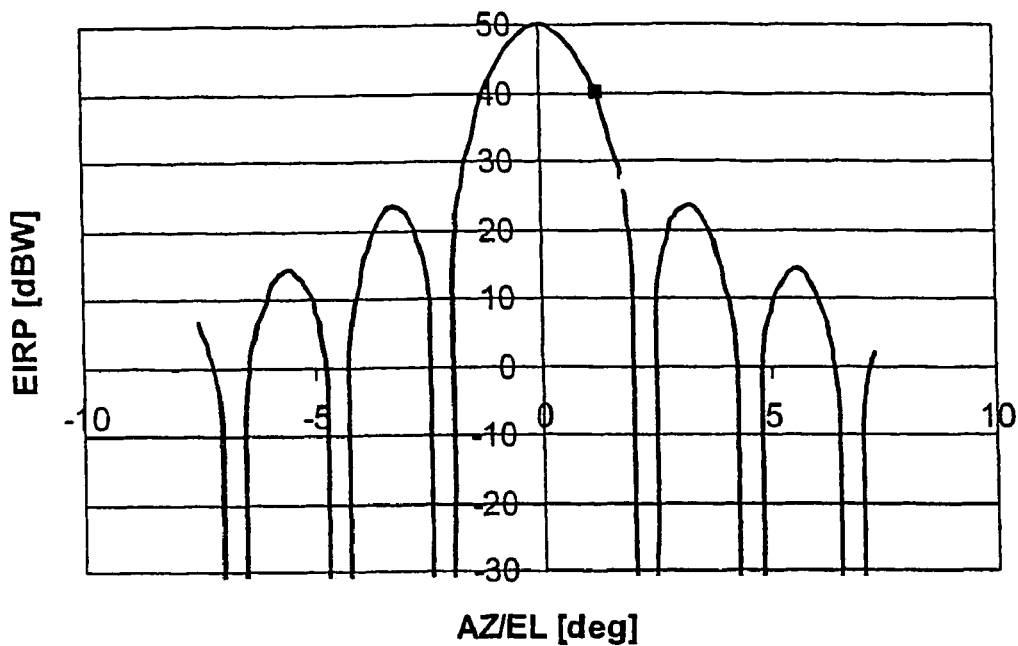
FIG. 11 shows the antenna pattern of a satellite antenna.
Figure 12:
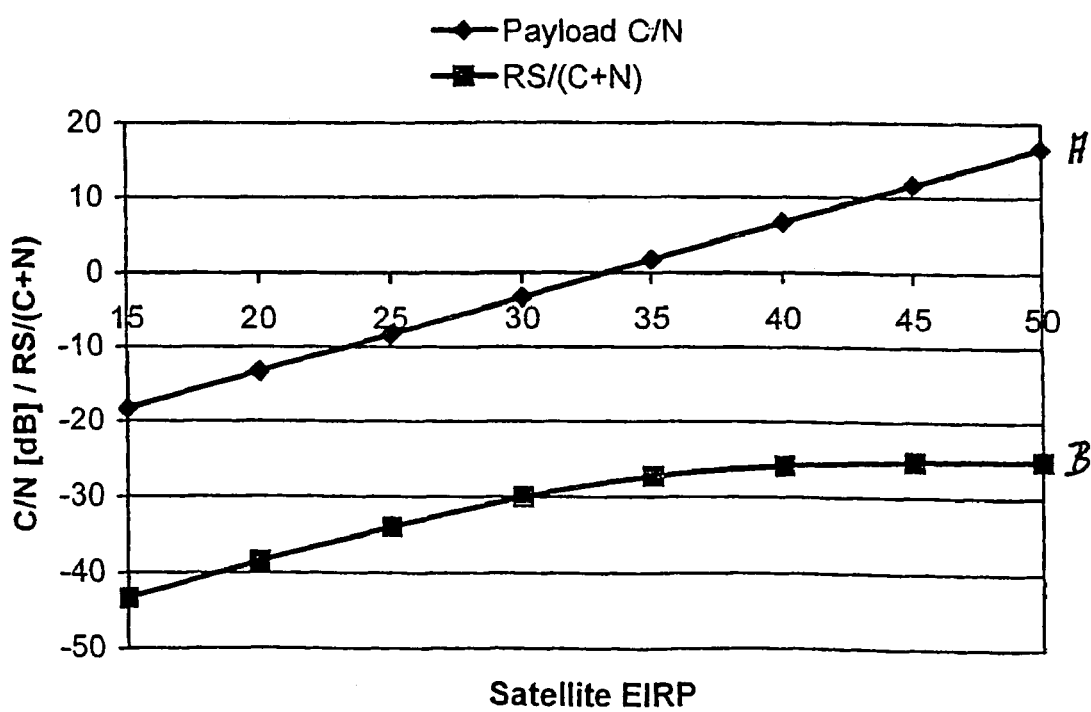
FIG. 12 shows the relationship between the downlink EIRP and the C/N ratio of a signal received at a receiving station.
Figure 18:
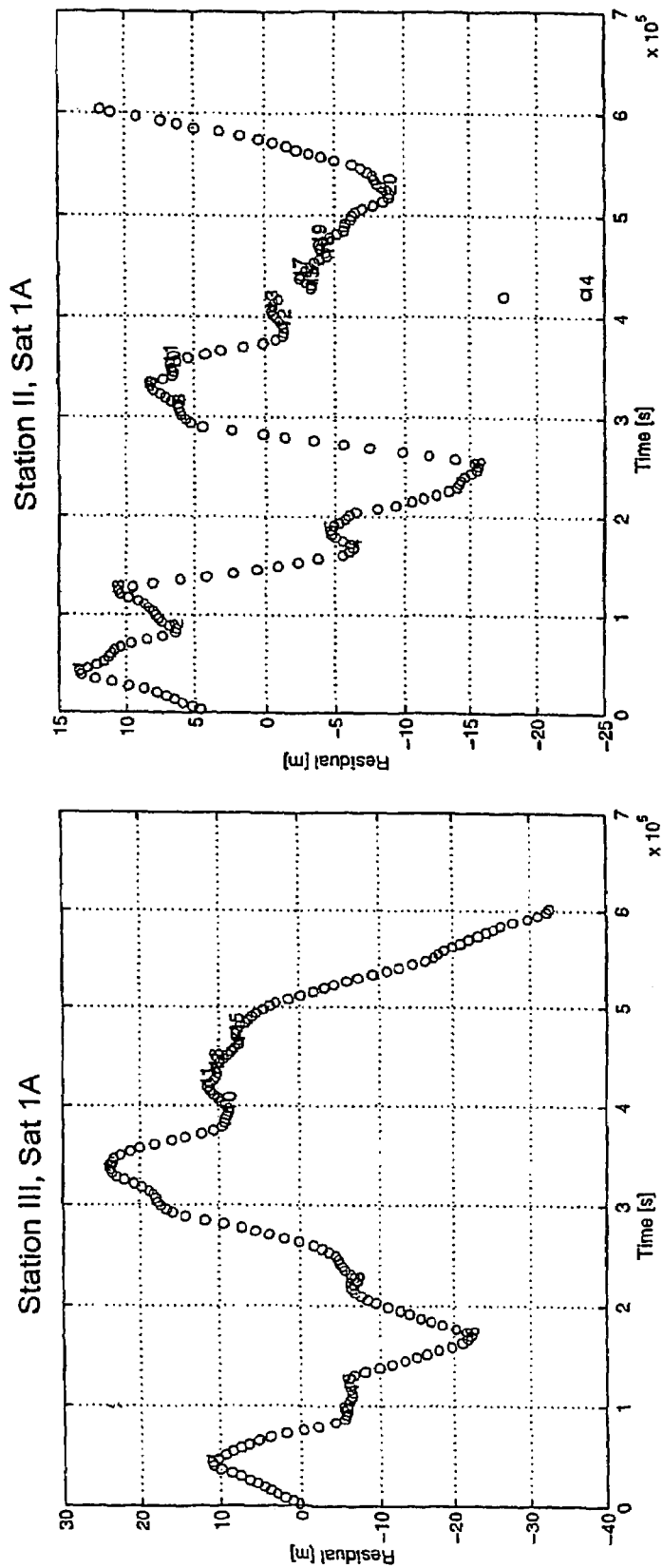
FIG. 18 shows the measurement of the time synchronisation error for different receiving stations with regard to one satellite.

FIG. 18 shows the measurement of the time synchronization error for different receiving stations with regard to one satellite. Again, the pseudo ranging configuration according to FIG. 5 is assumed, wherein at one orbital position a satellite cluster with satellites 1A, 1B, 1C, 1D, 1E, 1F, 1G, and 1H is provided. As can be seen from the measurement result according to FIG. 18, the time synchronisation error is not correlated between the stations III and II. However, according to the cognition of the invention, the time synchronisation error for one station with regard to different satellites is nearly the same. This result is shown in FIG. 19.

Figure 19:
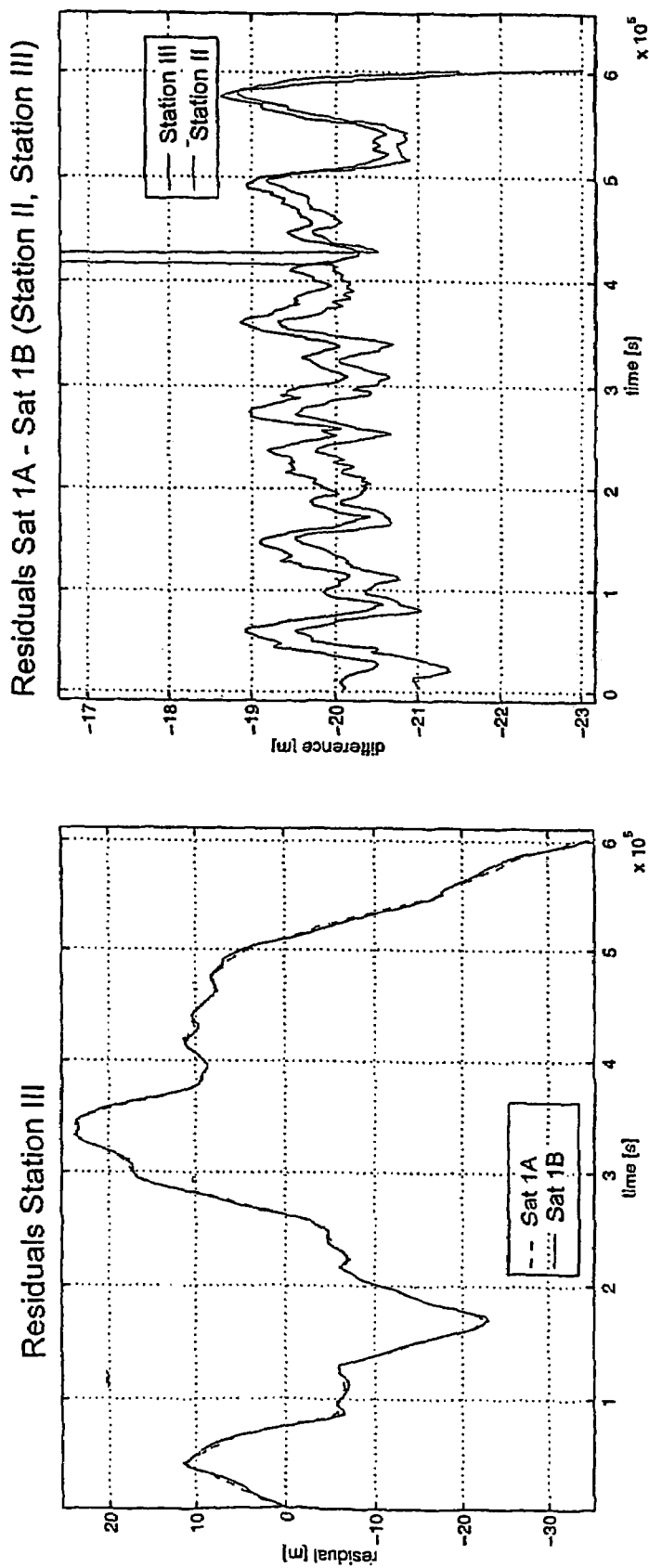
FIG. 19 shows the measurement of the time synchronisation error for different receiving stations with regard to two different satellites.

FIG. 19 shows the measurement of the time synchronisation error for different receiving stations with regard to two different satellites. Again referring to FIG. 5, the satellites 1A and 1B within the same orbit position are chosen, wherein the ranging error is measured over time for station III. As it can be seen on the left-hand side, the ranging errors are nearly the same, wherein at the right-hand side the difference between both measurements is shown.

The result of FIG. 19 is the following: If one knows the position of one of the two satellites, let say the satellite 1B, it is possible to derive the synchronisation error between each receiving station and the transmission station. Knowing this synchronisation error, the measured pseudo range data for satellite 1A can be corrected. The resulting arrangement for such a measurement is shown in FIG. 20.

Figure 20:
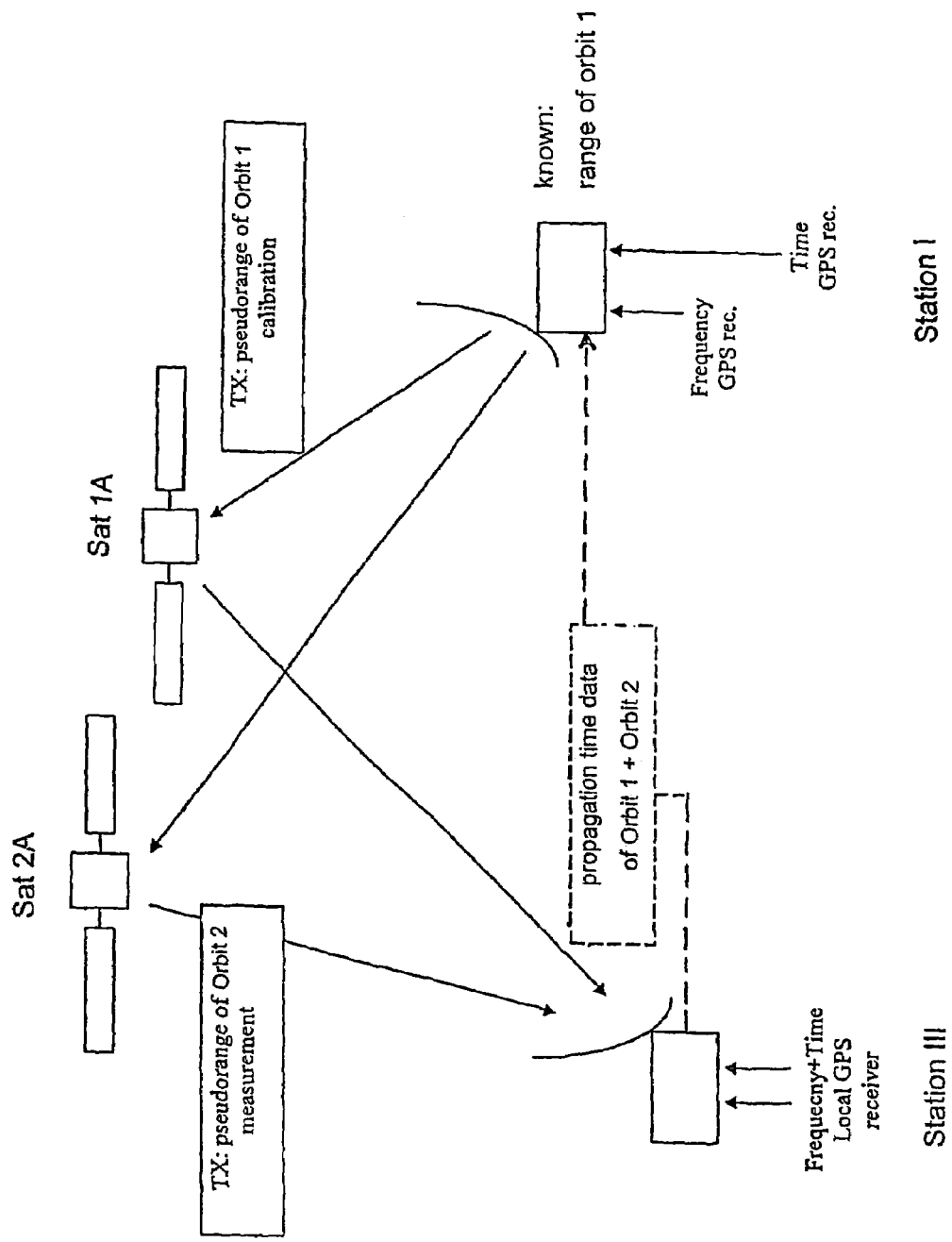
FIG. 20 shows the basic configuration of a pseudo range measurement with regard to two different satellites.

FIG. 20 shows the basic configuration of a pseudo range measurement with regard to two different satellites. It is assumed that station I is the master station with a transmission and a receiving equipment.

On the other hand, the other stations are receiving stations, wherein merely station III is shown by way of an example. It is assumed that the position of the satellite 1A is known at the location of station I. The pseudo range measurement by the receiving station III is then performed by the following steps:

In a first step, two predetermined signal patterns are transmitted from the station I via the satellites 1A and 2A to the receiving station III. In a next step, the receiving station III transmits the propagation time data on the basis of a pseudo range measurement of orbit 1 and orbit 2 to the station I. Since according to the assumption the range of orbit 1 at the station I is known, a correction calculation can be carried out as explained according to FIG. 19. Thereby, the ranging information of the satellite 2A can be calculated and can be corrected by known synchronization error with reference to the satellite 1A.

As a result, a pseudo ranging measurement can be provided on the basis of an arbitrary common time base with limited accuracy, wherein the common time base is corrected by the reference ranging information of the reference satellite 1A. Thereby, a GPS-independent pseudo ranging system can be built up.

Figure 21:
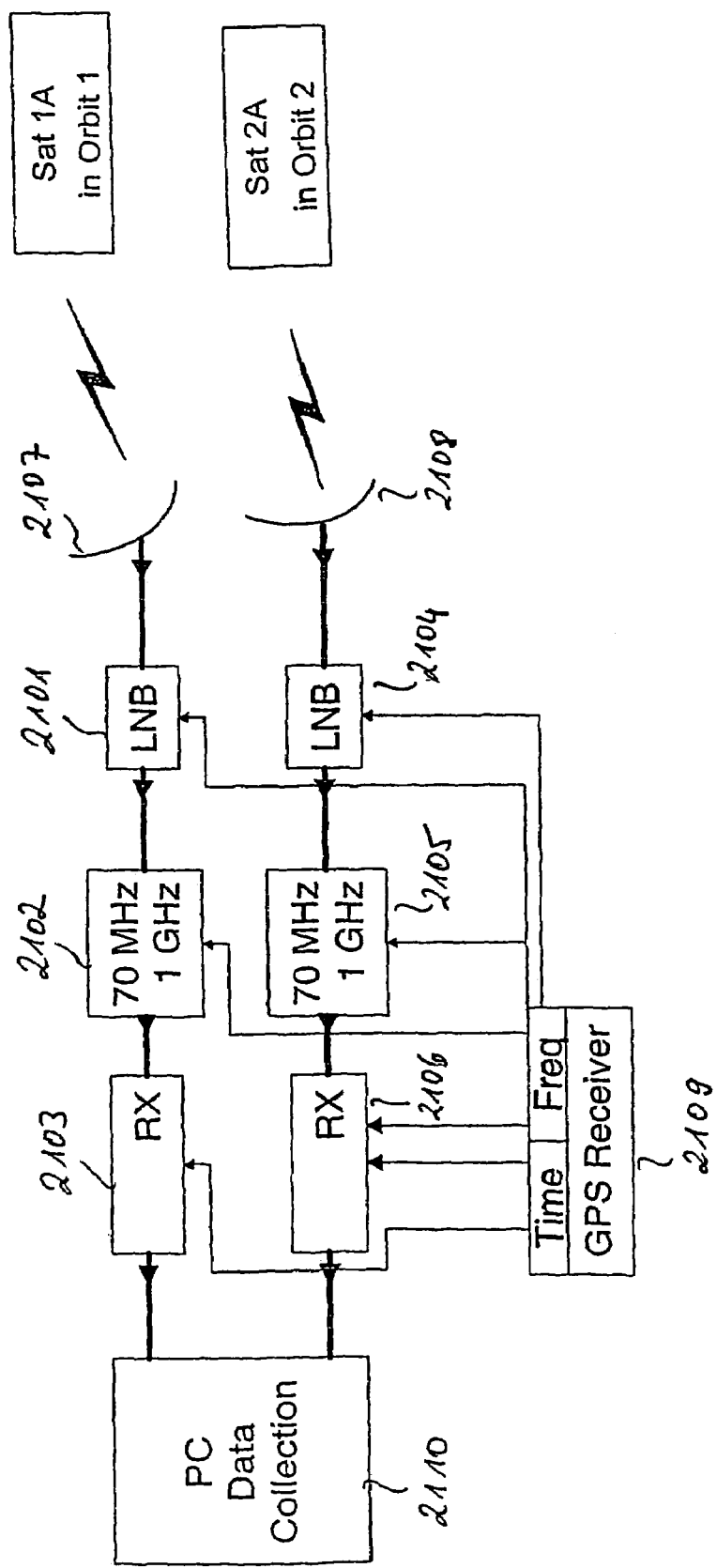
FIG. 21 shows the processing equipment for one receiving station of the basic configuration according to FIG. 20.

FIG. 21 shows the processing equipment, for one receiving station of the basic configuration according to FIG. 18. As it can be seen, the receiving equipment can be built up very simply which leads to an inexpensive structure of the receiving stations. Each receiving station comprises two similar receiving arrangements comprising an LNB 2101, 2104 connected to receiving antennas 2107, 2108, a down-converter 2102, 2105 and a demodulator 2103, 2106. The components are controlled by a frequency and timing device 2109, which comprises also a common data base, e.g. a simple GPS receiver. The data are collected in a data collection unit 2110 for determining the propagation time data of orbit 1 and orbit 2.

The invention claimed is:

1. System for providing a common time base between different locations on earth, comprising:
    a first spacecraft (Sat 1A) carrying a first component of a communication channel, wherein the position of said first spacecraft (Sat 1A) is known,
    a plurality of receiving stations at different locations on earth, wherein each receiving station is adapted to receive a first reference signal from said first component,
    synchronisation means adapted to provide a synchronised time base between the plurality of receiving stations, and
    correction means adapted to correct the synchronisation error of the synchronised time base by the known position of the first spacecraft (Sat 1A) and in accordance with the propagation time of each received first reference signal, wherein at least one receiving station comprises a correlation receiver yielding a correlation gain for receiving the first reference signal, wherein the first spacecraft transmits in a footprint, which is the coverage area of a payload signal, and wherein the correlation receiver recieves the first reference signal outside the footprint of the first spacecraft.

2. System according to claim 1, wherein the correlation receiver is based on the correlation of a predetermined signal pattern contained in the first reference signal.

3. System according to claim 1, wherein the correlation receiver is based on the spread spectrum demodulation of a spread spectrum signal.

4. System according to claim 1, further comprising means for determining ranging information of a second spacecraft (Sat 2A) with the aid of the first spacecraft (Sat 1A) whose ranging information is known, wherein the second spacecraft (Sat 2A) carries a second component of a communication channel, wherein each receiving station is adapted to receive independently a second reference signal from the second component,
    and wherein a calculation means is adapted to calculate said ranging information of said second spacecraft (Sat 2A) in accordance with the propagation time of each second reference signal and in accordance with the corrected synchronised time base.

5. System according to claim 3, wherein the spread spectrum demodulation yields a processing gain which corresponds to the correlation gain.

6. System according to claim 4, wherein at least one receiving station comprises a correlation receiver yielding a correlation gain for receiving the first reference signal and/or the second reference signal.

7. System according to claim 6, wherein the correlation receiver is based on the correlation of a predetermined signal pattern contained in the first reference signal and/or the second reference signal.

8. System according to claim 6, wherein the correlation receiver is based on the spread spectrum demodulation of a spread spectrum signal.

9. System according to claim 8, wherein the spread spectrum demodulation yields a processing gain which corresponds to the correlation gain.

10. Method for providing a common time base between different locations on earth with the aid of a first spacecraft (Sat 1A) carrying a first component of a communication channel, wherein the position of said first spacecraft (Sat 1A) is known, comprising the steps of:
receiving a first reference signal from said first component by a plurality of receiving stations at different locations on earth,
providing a synchronised time base between the plurality of receiving stations, and
correcting the synchronisation error of the synchronised time base by the known position of the first spacecraft (Sat 1A) and in accordance with the propagation time of each received first reference signal, wherein for at least one receiving station a correlation method yielding a correlation gain for receiving the first reference signal is applied, the first spacecraft transmitting in a footprint, which is the coverage area of a payload signal, and the correlation receiver receiving the first reference signal outside the footprint of the first spacecraft.

11. Method according to claim 10, wherein the correlation method is based on the correlation of a predetermined signal pattern contained in the first reference signal.

12. Method according to claim 10, wherein the correlation method is based on the spread spectrum demodulation of a spread spectrum signal.

13. Method according to claim 10, further comprising the steps of determining ranging information of a second spacecraft (Sat 2A) with the aid of the first spacecraft (Sat 1A) whose ranging information is known, wherein the second spacecraft (Sat 2A) carries a second component of a communication channel, wherein
a second reference signal is received from said second component independently by a said plurality of receiving stations at different locations on earth,
and wherein said ranging information of said second spacecraft (Sat 2A) is calculated in accordance with the propagation time of each second reference signal and in accordance with the corrected synchronised time base.

14. Method according to claim 12, wherein the spread spectrum demodulation yields a processing gain which corresponds to the correlation gain.

15. Method according to claim 13, wherein for at least one receiving station a correlation method yielding a correlation gain for receiving the first reference signal and/or the second reference signal is applied.

16. Method according to claim 15, wherein the correlation method is based on the correlation of a predetermined signal pattern contained in the first reference signal and/or the second reference signal.

17. Method according to claim 15, wherein the correlation method is based on the spread spectrum demodulation of a spread spectrum signal.

18. Method according to claim 17, wherein the spread spectrum demodulation yields a processing gain which corresponds to the correlation gain.

19. Processing station for providing a common time base between different locations on earth with the aid of a first spacecraft (Sat 1A) carrying a first component of a communication channel, wherein the position of said first spacecraft (Sat 1A) is known, comprising:
propagation time data receiving means adapted to receive propagation time data from a plurality of receiving stations at different locations on earth, wherein each receiving station is adapted to receive a first reference signal from said first component and wherein a synchronised time base is provided between the plurality of receiving stations, and
correction means adapted to correct the synchronisation error of the synchronised time base by the known position of the first spacecraft (Sat 1A) and in accordance with the propagation time of each received first reference signal, wherein at least one receiving station comprises a correlation receiver yielding a correlation gain for receiving the reference signal, wherein the first spacecraft transmits in a footprint, which is the coverage area of a payload signal, and wherein the correlation receiver receives the first reference signal outside the footprint of the first spacecraft.

20. Processing station according to claim 19, further comprising means for processing ranging information of a second spacecraft (Sat 2A) with the aid of a the first spacecraft (Sat 1A) whose ranging information is known, wherein the second spacecraft (Sat 2A) carries a second component of a communication channel,
wherein each receiving station is adapted to receive a independently a second reference signal from the second component, and wherein a calculation means is adapted to calculate said ranging information of said second spacecraft (Sat 2A) in accordance with the propagation time of each second reference signal and in accordance with the corrected synchronised time base.

21. Processing method for providing a common time base between different locations on earth with the aid of a first spacecraft (Sat 1A) carrying a first component of a communication channel, wherein the position of said first spacecraft (Sat 1A) is known, comprising the steps of:
receiving propagation time data from a plurality of receiving stations at different locations on earth, wherein each receiving station is adapted to receive a first reference signal from said first component and wherein a synchronised time base is provided between the plurality of receiving stations, and
correcting the synchronisation error of the synchronised time base by the known position of the first spacecraft (Sat 1A) and in accordance with the propagation time of each received first reference signal, wherein at least one receiving station comprises a correlation receiver yielding a correlation gain for receiving the reference signal, the first spacecraft transmitting in a footprint, which is the coverage area of a payload signal, and the correlation receiver receiving the first reference signal outside the footprint of the first spacecraft.

22. Processing method according to claim 21, further comprising the steps of processing ranging information of a second spacecraft (Sat 2A) with the aid of the first spacecraft (Sat 1A) whose ranging information is known, wherein the second spacecraft (Sat 2A) carries a second component of a communication channel,
wherein each receiving station is adapted to receive independently a second reference signal from the second component, and wherein said ranging information of said second spacecraft (Sat 2A) is calculated in accordance with the propagation time of each second reference signal and in accordance with the corrected synchronised time base.

* * * * *

UNITED STATES PATENT AND TRADEMARK OFFICE
CERTIFICATE OF CORRECTION

| | | |
|---|---|---|
| PATENT NO. | : 7,512,505 B2 | |
| APPLICATION NO. | : 10/675408 | |
| DATED | : March 31, 2009 | |
| INVENTOR(S) | : Guy Harles | |

It is certified that error appears in the above-identified patent and that said Letters Patent is hereby corrected as shown below:

In the Claims:

At column 18, claim 1, line 40, "recieves" should read --receives--.

Signed and Sealed this
Twelfth Day of April, 2011

David J. Kappos
*Director of the United States Patent and Trademark Office*